(12) United States Patent
Voudouris

(10) Patent No.: US 11,419,704 B2
(45) Date of Patent: Aug. 23, 2022

(54) ORTHOPEDIC-ORTHODONTIC MOLAR DISTALIZER

(71) Applicant: Spartan Orthodontics Inc., Toronto (CA)

(72) Inventor: John Voudouris, Toronto (CA)

(73) Assignee: Spartan Orthodontics, Inc., Toronto (CA)

( * ) Notice: Subject to any disclaimer, the term of this patent is extended or adjusted under 35 U.S.C. 154(b) by 668 days.

(21) Appl. No.: 16/083,816

(22) PCT Filed: Mar. 13, 2017

(86) PCT No.: PCT/CA2017/000053
§ 371 (c)(1),
(2) Date: Sep. 10, 2018

(87) PCT Pub. No.: WO2017/152267
PCT Pub. Date: Sep. 14, 2017

(65) Prior Publication Data
US 2020/0352682 A1    Nov. 12, 2020

Related U.S. Application Data

(60) Provisional application No. 62/415,350, filed on Oct. 31, 2016, provisional application No. 62/307,082, filed on Mar. 11, 2016.

(51) Int. Cl.
*A61C 7/28*    (2006.01)
(52) U.S. Cl.
CPC ............. *A61C 7/282* (2013.01); *A61C 7/285* (2013.01)
(58) Field of Classification Search
CPC ........... A61C 7/282; A61C 7/285; A61C 7/10; A61C 7/20; A61C 7/16; A61C 7/36; A61C 7/18; A61C 7/14; A61C 7/12; A61C 7/28; A61C 7/30; A61C 7/22; A61C 7/02; A61C 7/26
USPC .......................................................... 433/7
See application file for complete search history.

(56) References Cited

U.S. PATENT DOCUMENTS

| 7,618,257 B2 * | 11/2009 | Lluch | ........... A61C 7/00 433/18 |
| 2006/0257812 A1 * | 11/2006 | Lluch | ........... A61C 7/00 433/19 |

FOREIGN PATENT DOCUMENTS

WO    WO-2013144283 A1 * 10/2013    ............. A61C 7/36

* cited by examiner

*Primary Examiner* — Nicholas D Lucchesi
*Assistant Examiner* — Mirayda A Aponte
(74) *Attorney, Agent, or Firm* — McMillan LLP

(57) ABSTRACT

An orthodontic appliance for orthodontic treatment of a posterior maxillary sector extending from a mesial anchor tooth to a molar tooth unilaterally on the same side of the maxilla is provided. The appliance features a molar component, a mesial anchor tooth attachment, a long rod, and a hook. The long rod is saddle-shaped in the occlusal-gingival plane, and may have a distal step-down portion. The rod may extend at a mesial end thereof from the mesial anchor tooth attachment towards the molar component in a mesiodistal direction, and the rod may also have a mesial step-up portion starting from the mesial anchor tooth or premolar attachment. The hook may be located on the rod, for attachment with a traction element for direct molar traction. Under force of the traction element the rod exerts force on the molar component for molar distillation.

46 Claims, 18 Drawing Sheets

ORTHOPEDIC-ORTHODONTIC MOLAR DISTALIZER

FIELD OF THE INVENTION

The present invention relates to the field of orthodontic appliances, and more particularly to an orthopedic-orthodontic molar distalizer.

BACKGROUND OF THE INVENTION

A malocclusion is a misalignment or incorrect relation between the two jaws, maxilla and mandible, and the teeth of the respective two dental arches. This is often referred to as a skeletal dysplasia characterized by overjet of the upper jaw and upper incisors, and often requires external headgear wear. There are generally three orthodontic terms to describe direction. Buccal-lingually means from the cheek side to the tongue side, respectively. Mesial-distally means from anterior to posterior or front to back. Occlusal-gingivally means from the bite side to the gum side. Malocclusion or malalignment of the bite, may be classified in one of three classes:

Class I: Neutrocclusion where the molar relationship of the occlusion is within normal limits. This is described as the maxillary (or upper) first molar mesial cusp fitting into the central groove of the mandiubular (or lower) first molar, and where the other teeth may have additional problems such as spacing, crowding, or vertical alignment issues such as over or under eruption.

Class II: Distocclusion where the mesiobuccal cusp tip of the upper first molar is anteriorly or forwardly positioned ahead of the mesiobuccal groove of the lower first molar and instead is anterior to it (often called a large "overbite" or technically a large overjet of the upper teeth anterior to the lower dentition). Again, the Class II can be a result of the skeletal components of the upper jaw (maxillary segment) and/or lower jaw (mandibular segment) being malaligned or may additionally involve the dentition being maligned (above). Class II also has two divisions where: Division 1 has molar relationships such as Class II with the anterior teeth protruding; and Division 2 has molar relationships like Class II but the central incisor teeth are retroclined and the lateral incisor teeth are seen anteriorly overlapping the centrals. It is important that the upper first molars are often and generally displaced and rotated mesially in Class II malocclusions taking up more space in the upper dental arch and contributing to the overjet, requiring correction.

Class III: Mesiocclusion is found in patients where the upper molars are placed not in the lower molar mesiobuccal groove but where the upper molar is located posteriorly to the lower molar central groove and often referred to as an underbite.

A distalizer applies to the treatment generally, of the upper teeth and upper jaw with a Class II overjet condition above but can also be used in the lower jaw or teeth by reversing the direction of force to be used in the correction of a Class III malocclusion.

Rotation and distalization of upper molars, with segmented archwires and orthodontic brackets (braces) in conjunction with Class II, up and down, inter-arch elastics with or without headgear or fixed functional appliances (which hold the lower jaw forward and downward) is not new. Distalizers have been used to correct one or more of the malocclusions described above for more than half a century. One such distalizer is described in U.S. Pat. Nos. 6,976,839; 7,238,022; and 7,618,257, which all disclose an auxiliary element for the segmented distalization of the posterior upper jaw bone (maxilla) sector specifically from canine (or alternatively premolar) to molar in orthodontic treatment. The orthodontic appliance or element includes two components: a mesial segment and a distal segment. The mesial segment is composed of a rectangular anterior bonded canine attachment with its bonding base attached and fixed to the enamel of the canine with bonding resin adhesive. This canine attachment has a buccally protruding anterior end, as a horizontal handle-like portion also directly attached to the canine dental unit that facilitates retention of a separate elastic element placed by the patient individually that is stretched down from the anterior end to a separate mandibular first molar attachment on each side so as to produce a diagonally-directed interjaw and up-down inter-arch force (between the maxillary and mandibular dental arches). This mesial component includes an elongated and arched rod extension that is part of, and firmly attached off of the distal end of the bonded canine attachment. The other end of the rod has a flat, spherical member with a lateral and centrally located hole opening, or orifice for a permanent pin that largely permits rotation in the bucco-lingual direction.

The distal component is a smaller distally or (posteriorly) located element generally attached to the upper molar on each side of the upper jaw. The distal component is composed of a shoe-shaped receptacle located in the middle portion with an outside base that attaches to the tooth. The rod's spherical end member is coupled and permanently pinned with the shoe-shaped receptacle connecting the separate pin of the receptacle to the distal sphere-shaped end of the mesial segment. The permanently welded pin on either side of the shoe receptacle where the pin is located in the center of the shoe passes through the housing orifice of the disk-shaped rod end. A projecting pivot of the receptacle cavity of the distal segment is placed within a lateral slot of the mesial segment sphere to limit rotation of the spherical end member.

These distalizer mechanisms as described above are often complex and difficult to manufacture in three or four pieces with additional precision rotation pins through the rod connecting intricately to the distal component, and difficult to assemble. The projecting pivot and slot that limits rotation also increases difficulty in assembly. As two distalizers are used for balance in total, one on the left side and one on the right side of the upper jaw, a complex distalizer is cost prohibitive.

Moreover, prior art distalizers are characterized by lateral rotation pins that fix the mesial segment rod to the distal segment. These lateral pins result in the force on the mesial segment being applied, and being limited by the slot on the spherical-shape located specifically on the lateral lingual surface due to the coupling with the receptacle of the distal segment. From a top transverse perspective, this lingual lateral contact of the lateral receptacle pin within the lateral slot of the spherical-shape of the mesial segment also reduces the distance, and thereby moment of force (forcex distance) from the centre of resistance of the molar, for prior art distalizers that is not ideal.

This reduction in moment of force above in prior distalizers was not favorable for three reasons in 3 dimensions. First, from a top occlusal view and in the transverse dimension there was a reduction in the amount of molar rotation distally because the distance, from the lingually-located, surface slot on the sphere to the centre of resistance of the molar, was shortened. This shortened distance transversely also applied to the other two centers of resistance of the dentition, and the maxilla. Furthermore, from a side buccal view, when a force was applied vertically and at a lower and thereby longer distance, at the level of the molar crown, the crown of the molar began to tip posteriorly. Later, after treatment and in retention, this resulted in the tipped molar crown re-aligning itself under the forward position of the root, known as orthodontic relapse. Third, from the side buccal view and in the horizontal dimension it was obvious when the elastic force was applied in prior distalizers from the anterior end of the mesial segment the elastic tipping force and the distance was longer and farther away from the center of resistance of the molar that also led to unstable molar tipping. When the pins were simply replaced by lateral crimping of the receptacle in the distal segment of prior art distalizers, there was little change to the three adverse moments of forces in 3-dimensions above since similar lateral contact forces were specifically established, rather than purely distal forces directed at the back of the molar distal segment that are more desirable.

In addition, the other more common, and most clinically visible complications for patients that has been recognized, is that both upper canines become over-extruded, elongating the canine out of its tooth socket due to the elastic traction. This poses a serious aesthetic, and functional issue as interferences in the occlusion (bite) for patients with prior distalizers. Once upper canines have been over-extruded they are difficult to re-intrude because they are the longest rooted teeth in the maxilla.

It is ideal biomechanically to push the molar horizontally and vertically from as close to the centers of resistance of the molar, the entire dentition, and the maxilla that are all located closer to the upper part of the roots. For this reason, it is preferable and indicated in orthodontic biomechanics to translate the molar roots, or bodily move the molar posteriorly by pushing more distally in the horizontal dimension, and from a more gingival location that is closer vertically to the three centers of resistance, compared to prior distalizers.

Finally, the preferred method of molar distalization is to apply as direct a force to the molar as possible. (Conversely, to prevent canine over-extrusion it is ideal to avoid direct force on the canine at the anterior end). The method of distalizing the molar in prior distalizers is indirect vs. direct force because the prior art uses a force on the canine rather than the force being closer to the molar that requires movement. This results is a domino-effect of indirect force from the canine crown, and root encased in bone, to the bar and sphere (and to the obstructing two middle premolar teeth) resulting in a dissipated force to the molar tube.

Overall the goal is to prevent upper canine over-eruption while applying the inter-arch elastic force more posteriorly (distally) and higher (gingivally) to be closer biomechanically to the 3 centers of resistance for greater, bodily molar movement. Conversely, from a transverse perspective it is also ideal to push on the molar tube a further distance to the buccal away from the center of resistance of the molar. These improvements would also make canine, and bodily molar movements more stable long-term, precluding relapse in retention.

SUMMARY OF THE INVENTION

In one aspect of the present invention there is provided an orthodontic appliance for orthodontic treatment of a posterior maxillary sector extending from a mesial anchor tooth to a molar tooth unilaterally on the same side of the maxilla, comprising: a molar component, a mesial anchor tooth attachment, a long rod, and a hook. The molar component includes a bonding pad for affixing the molar component to a molar tooth and may have a mesial opening to an interior of the molar component. The mesial anchor tooth attachment includes a bonding pad for affixing the attachment to a mesial anchor tooth. The long rod may be saddle-shaped in the occlusal-gingival plane, and may have a distal step-down portion towards the molar. The rod may extend from the anchor tooth attachment towards the molar component in a mesiodistal direction. The hook may be located on the rod, for attachment with a traction element for direct molar traction. The distal end of the rod may engage at least one surface of the molar component to exert a distal force on the molar tooth when under a force of the traction element on the hook.

The distal step-down portion of the rod may be curved. The traction element may comprise an elastic. The distal end of the rod may be occlusally lower than the mesial end thereof. Alternatively, the mesial end of the rod may be occlusally lower than the distal end thereof. The mesial end of the rod may comprise a mesial set-up portion from the mesial anchor tooth attachment to the rod. The mesial step-up portion may be curved. The at least one surface of the molar component may be a distal wall thereof. The interior of the molar component may be tapered from the opening towards the distal wall.

In one embodiment, the hook is located on an upper section of the saddle-shaped rod. In another embodiment, the hook is located on the mesial step-up portion of the saddle-shaped rod. In yet another embodiment, the hook is located on the distal step-down portion.

The mesial anchor tooth attachment may include an orthodontic tube containing an archwire slot therethrough in the mesiodistal direction, the archwire slot being sized for permitting the insertion of an archwire to pass generally mesiodistally from the mesial anchor tooth attachment into at least one premolar bracket. The orthodontic appliance may comprise at least one premolar bracket for affixment to a premolar and the bracket may be located occlusally below the upper section of the rod.

As the distalizer is moved distally by force of the traction element the distal step-down portion of the saddle-shaped rod may engage a mesial end of a visor over-hang formed on a gingival roof wall of the molar component. The visor overhang may be curved to follow the path of the saddle-shaped rod as the molar tooth is distalized. The visor may be a separately welded component affixed to the molar component or integrally formed therewith.

In some embodiments, the rod may comprise an engagement feature at the distal end thereof, and the molar component may have a retention feature suitable for receiving the engagement feature. In one embodiment, the engagement feature is essentially D-shaped, and the retention feature is sinusoidal. In another embodiment, the engagement feature is generally spherical and the retention feature is in the form of a funneled keyhole clasp. The engagement feature may be coupled to the retention feature and may push distally on a distal wall of the molar component.

In yet another embodiment the molar component is in the form of a C-clasp having an occlusal floor for supporting the engagement feature. A U-clamp containing locking claws which cooperatively fit with locking grooves on the C-clasp may be provided. The locking claws permit the engagement and locking of the U-clamp over the C-clasp thus retaining the engagement feature within the C-clasp.

In one embodiment, the molar component may include locking claws that maintain the engagement feature within the molar component.

In one embodiment, the orthodontic appliance may comprise a vertically-oriented push flange lever near the distal end of the rod and mesial from the engagement feature, for exerting a distal force on the molar component. The push flange lever may be offset with respect to the rod such that the push flange lever engages a mesial edge of a wall of the molar component when the rod is moved distally under the force of the traction element.

In one embodiment, the molar component may be in the form of a flared clasp having a housing flared outwardly to the mesial for facilitating the insertion of the engagement feature into an interior of the clasp housing. The engagement feature may be retained in the retention feature by a restriction feature on the buccal wall of the molar component. The engagement feature may further be retained in the retention feature by a restriction feature on a lingual wall of the molar component. The engagement feature may also be retained vertically inside the molar component by an occlusal floor and a gingival roof wall. The engagement feature may comprise an ellipsoid shape.

In another embodiment, the orthodontic appliance may comprise a vertically-oriented push tab lever near the distal end of the rod and mesial from the engagement feature, for exerting a distal force on the molar component. As the distalizer is moved distally by force of the traction element, the vertically-oriented push tab lever engages a mesial end of an occlusal floor of the molar component.

In yet another embodiment, the molar component may have an aperture formed in the distal wall for receiving the distal end of the rod therethrough. The interior of the molar component may be tapered from the opening towards a distal wall thereof. A portion of the distal end of the rod may frictionally engage an inside surface of a wall of the molar component to exert a distal force on the molar component under the force of the traction element on the hook located on the rod. The aperture may be sized so that the a portion of the distal end of the rod frictionally engages the distal wall at the aperture for exerting a distal force on the molar component under the force of the traction elastic on the hook. The orthodontic appliance may further comprise a blocking feature affixed to a distal tip of the distal end of the rod for preventing the rod from being removed from the molar component. The blocking feature may be crimped on, welded on, or integrally formed with the distal end of the rod. The orthodontic appliance may comprise a push flange lever near the distal end of the rod and positioned for exerting a distal force on a mesial end of the molar component. The push flange lever may be offset with respect to the rod such that the push flange lever engages a mesial edge of a wall of the molar component when the rod is moved distally under the force of the traction element. The wall of the molar component may be flared lingually such that the push flange lever engages a tip of the mesial edge of the wall. The aperture may have a length in the buccal-lingual direction longer than that in the occlusal-gingival direction, for permitting buccal-lingual movement of the distal end of the rod during treatment. The orthodontic appliance may comprise a vertically oriented push tab lever near the distal end of the rod and mesial from the engagement feature, for exerting a distal force on the molar component. As the distalizer is moved distally by force of the traction element, the vertically-oriented push tab lever engages a mesial end of an occlusal floor of the molar component.

The mesial anchor tooth may be a canine or a premolar tooth.

BRIEF DESCRIPTION OF THE DRAWINGS

The novel features which are believed to be characteristic of the present invention, as to its structure, organization, use and method of operation, particularly in terms of improved proximity to the 3 main centers of resistance of the upper jaw and teeth, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1A:
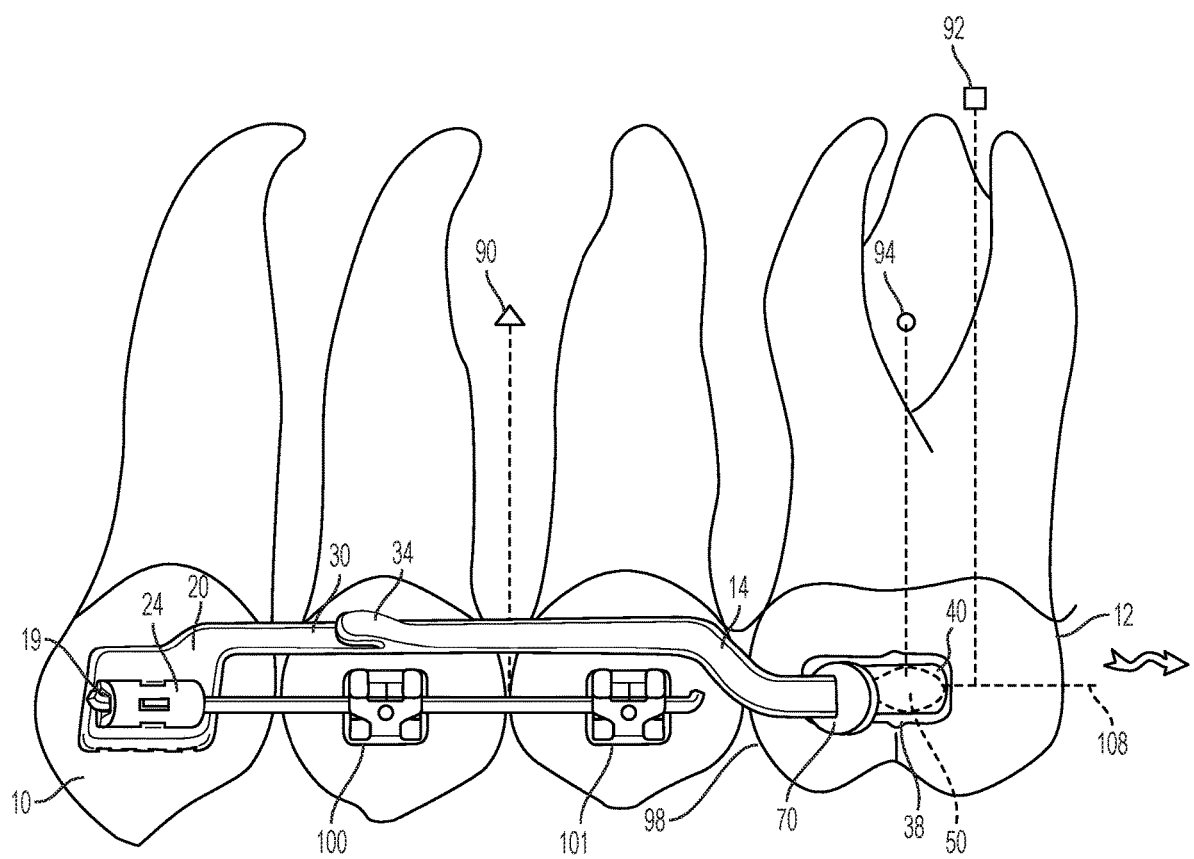
FIG. 1A is a buccal (side) view of the upper middle and posterior teeth showing the locations of the centers of resistance of the maxillary dentition, the maxillary first molar, and the maxilla (upper jaw), along with a sliding distalizer, in accordance with an embodiment of the present invention.

An orthodontic appliance for orthodontic treatment of a posterior maxillary sector extending from a mesial anchor tooth to a molar tooth unilaterally (i.e. on the same side of the maxilla) is provided. A mesial anchor tooth is commonly a canine, as shown in the attached figures, but may be a premolar if the canine is un-erupted or if it is less visible. The appliance is also referred to as a sliding distalizer, a molar distalizer, a sliding molar distalizer, or simply a distalizer throughout this document. With reference to the figures, the orthodontic appliance comprises a molar component 40, a canine attachment and a rod 30. Molar component 40 may be in the form of a tube, a clasp, or any other suitable shape, and is affixed to a molar tooth 12 via a bonding pad 38. The canine attachment includes a bonding pad 20 affixed to the enamel of a canine tooth 10.

Figures 11A, 11B:
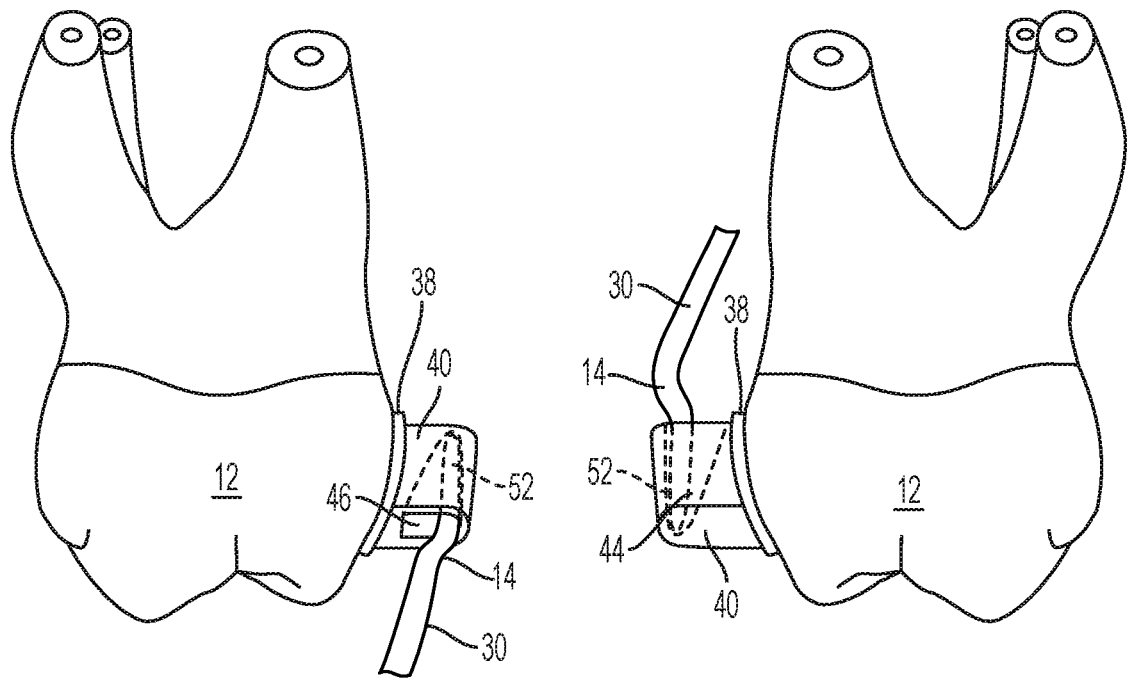
FIG. 11A is a mesial perspective view of a distal portion of a sliding distalizer, in accordance with yet another embodiment of the present invention shown in conjunction with a molar tooth.
FIG. 11B is a distal perspective view of the distal portion of the sliding distalizer of FIG. 11A shown in conjunction with a molar tooth.
Figure 11C:
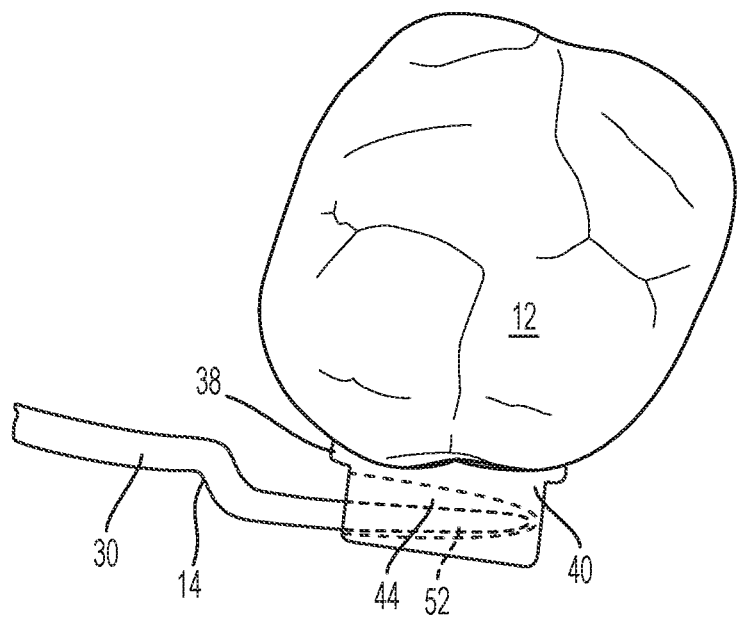
FIG. 11C is an occlusal view of the distal portion of the sliding distalizer of FIG. 11A shown in conjunction with a molar tooth.

The rod 30 has a step-up, saddle-shape in the occlusal-gingival plane and may be mildly curved buccolingually. In other embodiments, the rod 30 is straight in the buccal-lingual plane but saddle-shaped in the gingival-occlusal plane. Rod 30 also has a distal step-down portion 14, which is shown as diagonally curved, but may also be straight, substantially vertical, or angled, and may have rounded corners. In another embodiment the rod 30 may have a mesial step-up portion, which is shown as diagonally curved, but may also be straight, substantially vertical, or angled, and may have rounded corners. With reference to FIGS. 11A-11C for example, rod 30 extends at a mesial end thereof from the canine attachment towards molar tube 40 (i.e. distally or posteriorly towards the back of the mouth) in a mesiodistal direction and has a distal end 52 coupled with molar tube 40.

As seen in FIGS. 1A, 1C, 2, 3A, 4A, 5A, 8, 9A-9B, and 10A-10F, hook 34 is located on rod 30 to attach a separate traction force element, to a lower molar at a diagonal angle (shown in FIG. 10F) in order to exert direct force from the hook 34 on the rod 30 to the molar tube 40. The traction element shown in FIG. 10F is a traction elastic. However, the traction force element may also be a spring or another equivalent element that imparts traction force on the rod by attaching to hook 34. The positioning of hook 34 on rod 30 is advantageous because it is different than prior distalizers that have indirect force to the molar tube with a hook located on the anterior end of a canine pad that is in turn attached to the canine crown, canine root and encased in bone surrounding, where the canine hook is also located a longer distance away from the molar 34. As shown in the referenced figures, hook 34 is located on the saddle-shaped portion of rod 30. In other embodiments, (not shown) the hook 34 may be located on a diagonal portion of rod 30. For example, hook 34 may be located on a mesial step-up portion of rod 30 proximal the canine attachment. Alternatively, hook 34 may be located on a distal step-down portion 14 of rod 30, and may be smooth. With reference to FIG. 1A, the entire maxillary dentition center of resistance (CR) 90, the actual localized upper molar CR 94, and the upper jaw or maxilla CR 92 which is located near the area of the sutural connection between the maxilla with the zygoma (cheek bone) positioned approximately above the posterior roots of the upper molars, are identified. In some embodiments, the hook 34 may be located on a curved portion of rod 30. In other embodiments hook 34 may be located in the middle third portion of rod 30. The positioning of hook 34 on rod 30 on the saddle-shaped rod portion, and not directly on a dental unit encased in alveolar bone, is advantageous as the hook 34, independent of direct dental attachment, is also closer, compared to prior art devices, anterior-posteriorly to the CR of the molar 94, CR of the dentition 90 and to the CR of the maxilla 92. The hook 34 positioning on rod 30 as described also improves the opportunity for more bodily translation of the upper molar 12 to reduce molar tipping. The hook 34 positioning additionally improves the restriction of maxillary growth by being closer to the center of resistance of the maxilla 92 when heavy traction force is imparted directly on hook 34 by the traction element to restrict maxillary growth while the lower jaw grows forward for overjet correction. The hook 34 provides another advantage imparting indirect force to the canine since the hook is not directly attached to the canine, and secondly the hook is a longer distance away distally, and higher gingivally away from the canine anterior end, that in the prior art devices contributed to the recognized complication of canine over-extrusion (Dracula-canine appearance) with direct traction element placement to the canines. The hook 34 may be integrally formed with rod 30, or attached/welded thereto by suitable means.

A distal end 52 of rod 30 engages at least one surface of the molar tube 40 to exert a distal force on the molar tooth 12 when under a force of the traction element on the hook 34. For example, with reference to FIG. 11A-11C, distal rod end 52 engages a distal wall of the molar tube 40. In addition, the interior 44 (shown in dotted line) of molar tube 40 may be tapered from the opening 46 towards the distal wall of the molar tube. The distal end 52 of rod 30 (shown in dotted line inside the molar tube 40) is distal of the step-down, rod portion 14. The figures also show that molar tube 40 is affixed to molar tooth 12 via bonding pad 38.

With reference to FIGS. 1A, 1C, 2, 3A, 4A and 5A, 10A-F the canine attachment further includes an orthodontic tube 24. The orthodontic tube 24 may be a separate component welded, brazed, or form-molded into the attachment bonding pad 20 acting to attach to the canine enamel with bonding resin (not shown). The bonding pad 20 may be integrally formed at the mesial end of, or attached to a portion of, rod 30. The orthodontic tube 24 contains an archwire slot 19 therethrough in the mesiodistal direction. The attachment may be shaped as an angled rhomboid, rectangular-shaped, or otherwise suitably shaped. The archwire slot 19 may be sized for permitting the insertion of an archwire to pass generally mesiodistally from the canine attachment into at least one premolar bracket. The archwire slot 19 may be rectangular or have any other suitable shape. In FIGS. 10A-F the assembled sliding distalizer is shown with the hook 34 a significantly longer distance from the canine end and located on a non-dental unit, on the upper rod 30, in conjunction with an orthodontic tube 24 having a rectangular archwire slot 19.

Figure 10A:
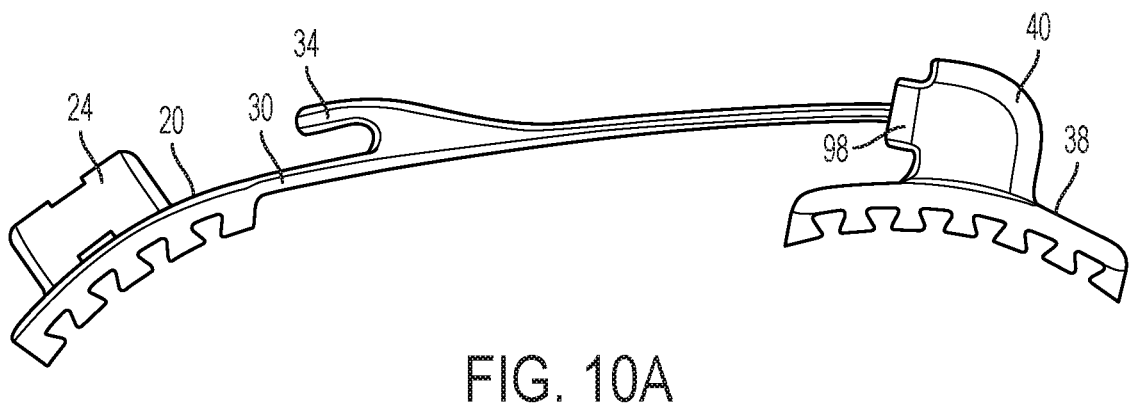
FIG. 10A is an occlusal view of the sliding distalizer shown in FIGS. 8, 9A-B.
Figure 10B:
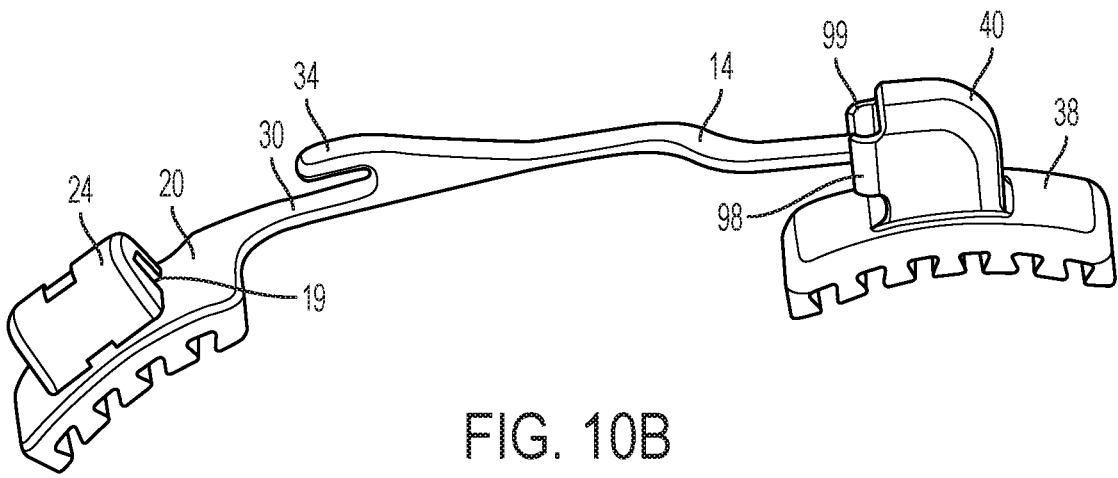
FIG. 10B is a three-quarter view of a buccal-occlusal perspective of sliding distalizer shown in FIG. 10A.
Figure 10C:
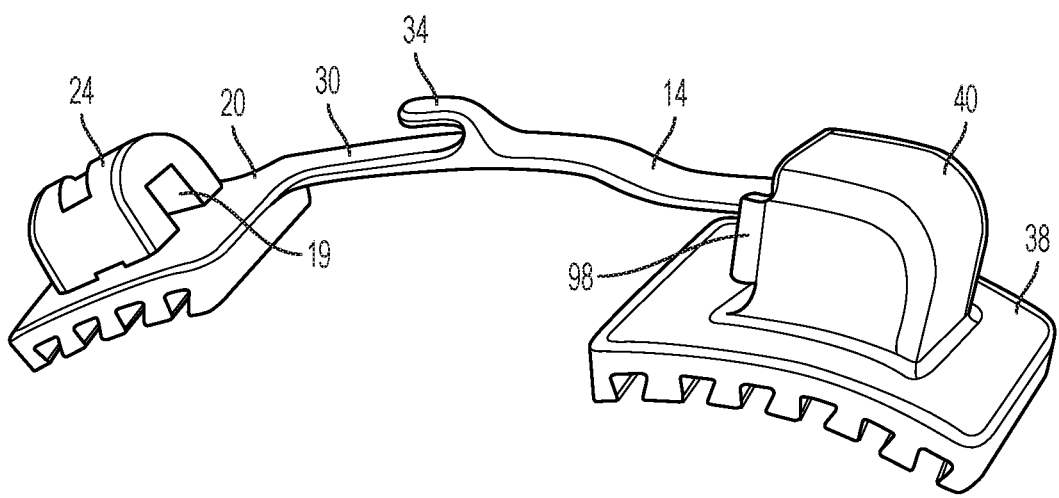
FIG. 10C is a three-quarter view from a distal-occlusal perspective of a sliding distalizer shown in FIGS. 10A,B.
Figure 10D:
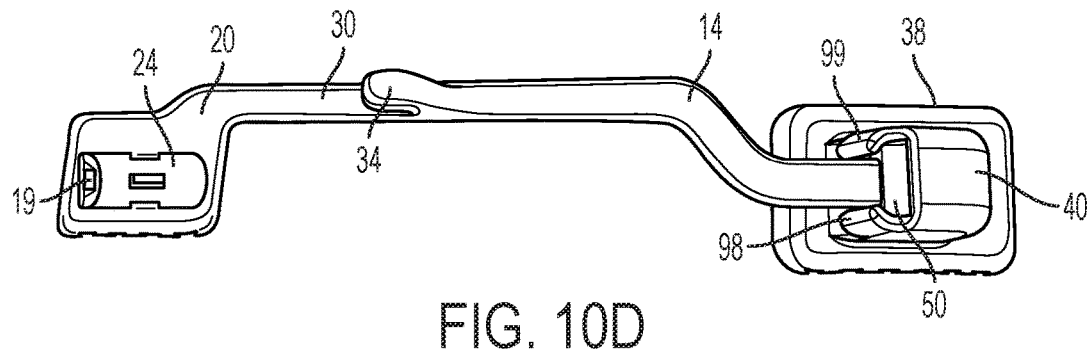
FIG. 10D is a buccal side view of the fully assembled mesial segment, and distal segment molar component with external locking claws folded in a curved configuration of the sliding distalizer shown in FIG. 9B.
Figure 10E:
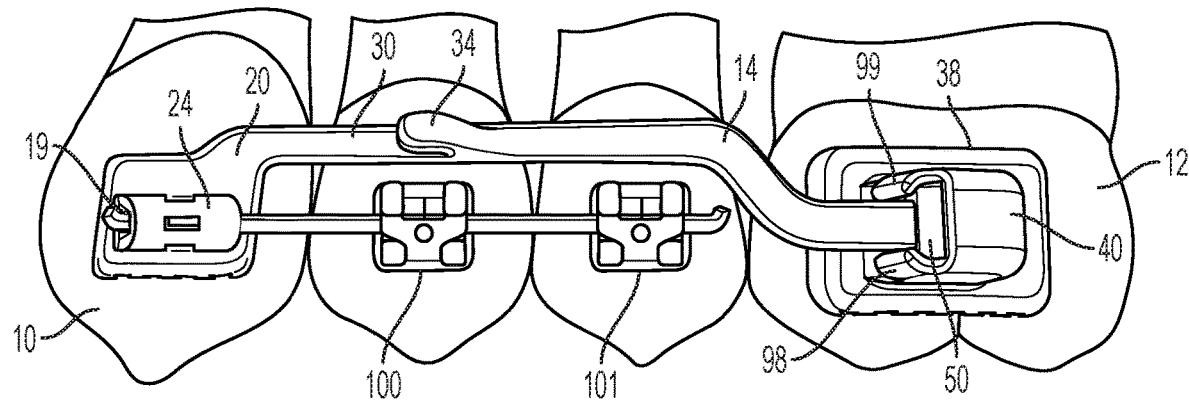
FIG. 10E is a buccal side view of the assembled mesial segment starting at the upper canine, two premolar self-ligating brackets containing a sectional, rectangular archwire passing to the upper orthodontic tube anteriorly. The distal segment molar component is shown with external locking claws folded in a curved configuration in the sliding distalizer of FIGS. 10B-D.

In FIGS. 10E, F, additional orthodontic brackets (braces) 100 and 101 at the upper first and second premolars, with a rectangular, stainless steel archwire are used as anchorage units or specialized anchor-loop guides that are accommodated and permitted to be placed by the step-up provision in the saddle-shaped rod 30. The saddle-shaped rod 30 is positioned gingivally above the premolar brackets 100 and 101, or anchor guides (not shown) to allow initially, natural distal drift of the premolars when sectional round archwires (not shown), that have generally less friction, are placed in the early first stage of alignment.

The sectional rectangular archwire prevents the complication of inadvertent canine over-extrusion found with prior art distalizers that is caused by the direct vertical inter-arch elastic force component (large upward-pointing arrow in FIG. 10F), on prior art hooks located on the anterior end, and directly on canine attachments. In FIG. 10F the hook 34, integrated on the rod 30, is located further distally away from the canine. This prevents direct pull-down of the canine and reduces the long lever arm exerting a tipping force that causes over-extrusion of the canine. The premolar brackets 100 and 101, or anchor-loop guides (not shown), further supporting the canine from being over-extruded, may also be self-ligating to enable easy removal of the sectional rectangular archwire located below (occlusal to) the saddle-shaped rod 30. The forces of the inter-arch elastic are located more posteriorly (distal) and higher, more gingival to be closer to the three centers of resistance (90, 92, and 94) because the elastic is attached on a functional middle hook 34 located on the bar 30 and is free of direct dental unit attachment permitting more direct elastic force to the molar (rather than applying indirect force to the molar via the anterior end of the canine attachment, mesial component that is also attached to the long-rooted canine tooth encased in bone in prior art). The keys are this bar-hook provides more direct force to the more proximal distal molar tube 40 of the sliding distalizer for molar distalization, and second it is more effective biomechanically because the bar hook is freely located, and higher gingivally to be closer to the center of resistance of the molar for bodily molar movement. Third, the higher bar hook is also more proximal to the center of resistance of the maxilla to restrict its growth in patients with overjet-overbite and skeletal dysplasia of the jaws.

The archwire may be a separate sectional archwire as shown in FIGS. 10E and 10F. The archwire may be placed into rectangular slot 19 of the orthodontic tube 24 located on the canine and through to two posteriorly located premolar brackets 100 and 101 that may be placed below rod 30. This produces an anterior anchorage segment in order to prevent the aesthetic complication of canine over-extrusion. Canine over-extrusion is directly due to tipping from the vertical vector of the traction force to the hook located at the anterior end of prior art distalizers. This results in a long lever arm away from the center of resistance of the anchoring molar 94 (FIG. 1A) producing a significant moment of extrusive force on the canine resulting in canine tipping and over-eruption with the prior art distalizers.

There are at least five advantages to the step-up, utility arch form or saddle-shape of the distalizer bar 30. It permits the location of the novel rod-hook 34 in a higher, more gingival position to allow the traction force to be closer to all 3 centers of resistance (90, 92, and 94) for: first, more bodily movement of the molar, and second, greater restriction of maxillary growth. Third, the saddle-shaped rod 30 permits the rod-hook 34 (that is not attached to a tooth) and the traction force to be closer and more direct against the molar tube 40 distal wall compared to prior art devices with a hook attached to the canine tooth at the anterior end causing the force to be further away, and that applies indirect force on the molar tube. Fourth, the saddle-shape allows the traction force to stay vertically off the canine directly, and rather provides an indirect, secondary force to the canine to prevent over-extrusion. Fifth, to further increase vertical canine anchorage, the saddle-shape specifically provides the space necessary for the placement of the two, miniaturized premolar brackets 100 and 101 that when combined with a segmented, rectangular stainless steel archwire to the orthodontic tube 24 forms a solid anchor to further prevent the complication of canine over-extrusion (FIG. 10F).

Figure 4A:
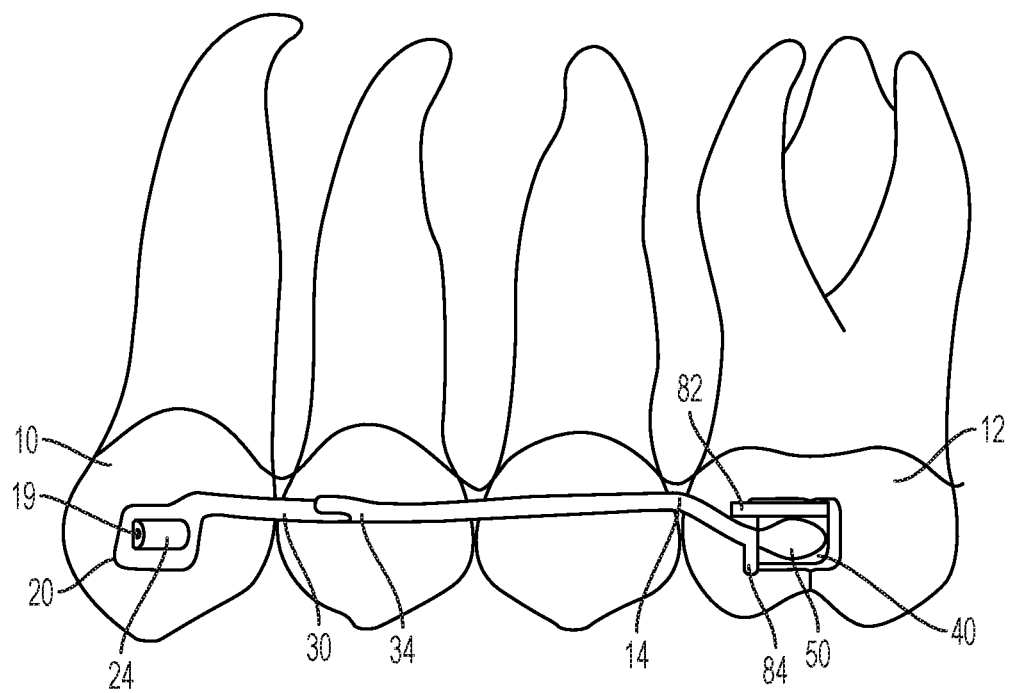
FIG. 4A is a buccal view of the upper middle and posterior teeth, along with a sliding distalizer, in accordance with yet another embodiment of the present invention.
Figure 4B:
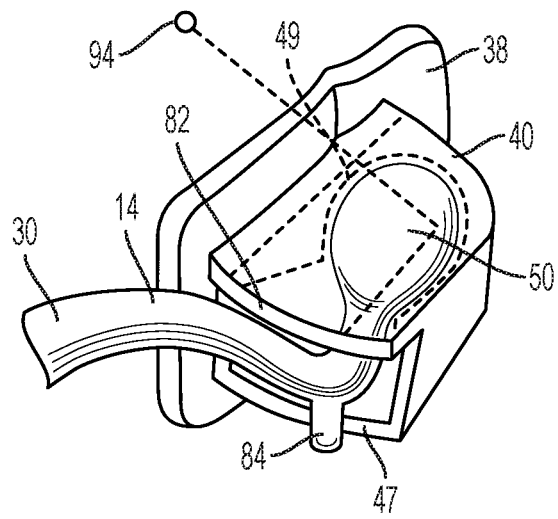
FIG. 4B is an enlarged mesial, buccal-gingival perspective view of a distal portion of the sliding distalizer of FIG. 4A.
Figure 5A:
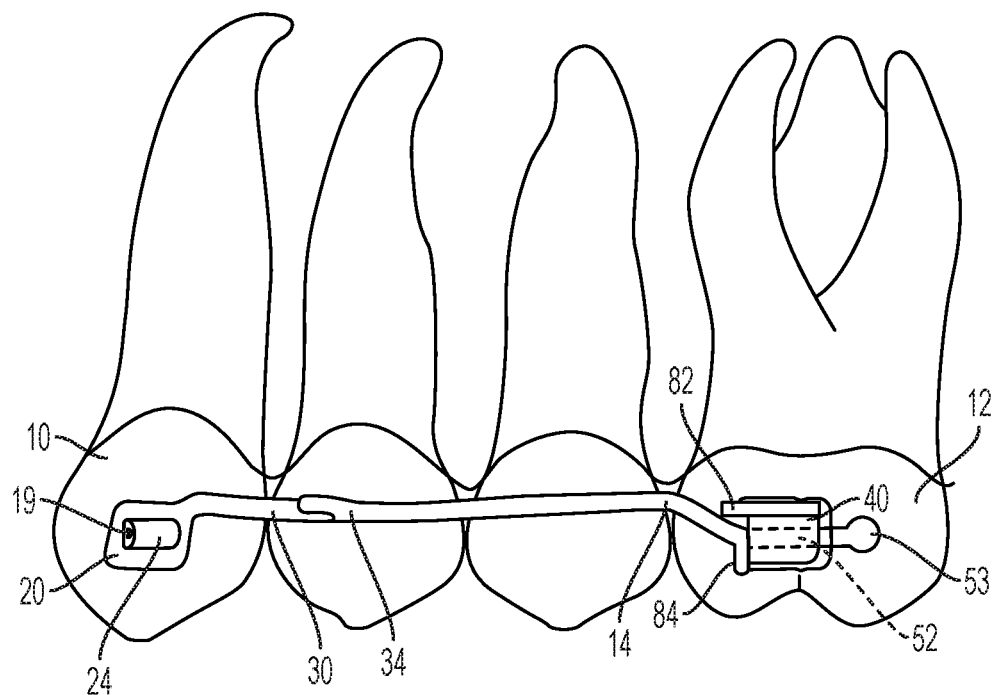
FIG. 5A is a buccal view of the upper middle and posterior teeth, along with a sliding distalizer, in accordance with yet another embodiment of the present invention.
Figure 5B:
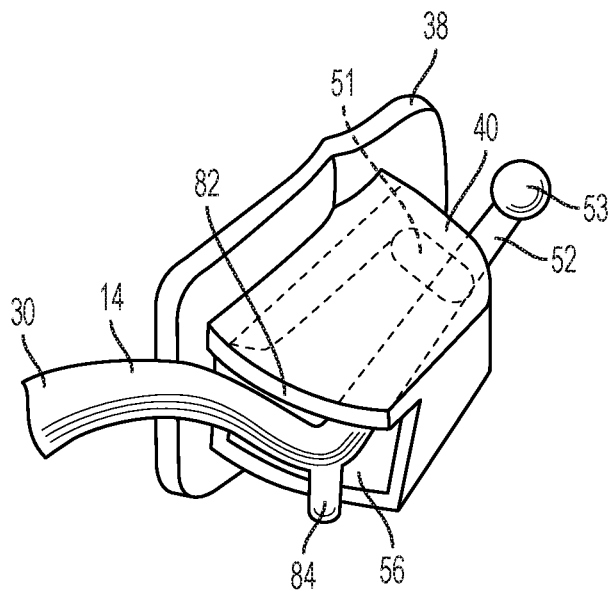
FIG. 5B is an enlarged generally mesial, and buccal-gingival perspective view of a distal portion of the sliding distalizer of FIG. 5A.

In some embodiments molar tube 40 is provided with a visor overhang 82 (FIGS. 4B and 5B) at a mesial gingival top thereof. In one embodiment, the distal sliding force caused by the traction element and transferred to rod 30 is applied to the molar tube 40 as the distal step-down portion 14 of the saddle-shaped rod 30 engages the visor-like over-hang 82 on molar tube 40, as can be seen in FIG. 4B and FIG. 5B. The visor overhang 82 may be curved to follow the path of the saddle-shaped rod as the molar distalizes. Visor overhang 82 may be a separate welded component affixed to a molar tube 40 or be formed as part thereof.

With reference to FIGS. 1A-1C, 2, 4A-4B, 8, 9A-9B, 10D-10F, 12A-12H, and 13, the distal end of rod 30 is provided with an engagement feature 50. Molar component 40 has a retention feature 49 suitable for receiving the engagement feature 50 of rod 30.

Figure 13:
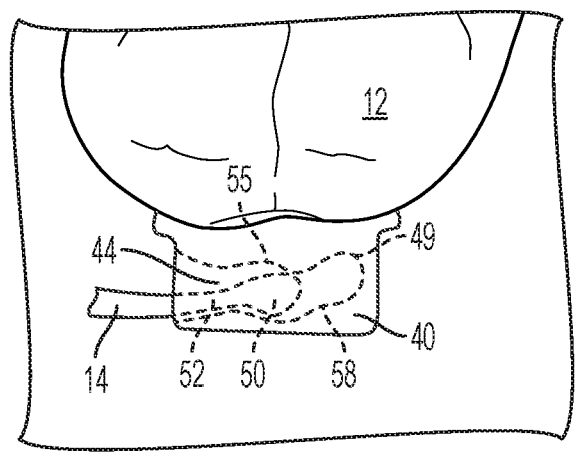
FIG. 13 is an occlusal view of a the distal portion of a sliding distalizer in accordance with yet another embodiment of the present invention.

In accordance with another embodiment of the present invention, FIG. 13 is an enlarged cross-sectional occlusal view of a molar tube 40 of a sliding distalizer showing a distal rod portion having an essentially D-shaped engagement feature 50 attached to or formed on distal end 52 of rod 30 that is distal of the step-down down portion 14. The D-shaped engagement feature 50 engages a sinusoidal retention feature 55 within the molar tube 40. Following a first phase of initial molar distalization (not shown), the D-shaped engagement feature 50 has slid mesially out from the initial most distal void 49 (dotted line away from with initial retention wall 58), and into the position shown in FIG. 13 wherein the engagement feature 50 occupies a portion of the second void 44. The engagement feature 50 begins to push distally once again on retention feature wall 55 for a supplemental second phase distalization.

Figure 12A:
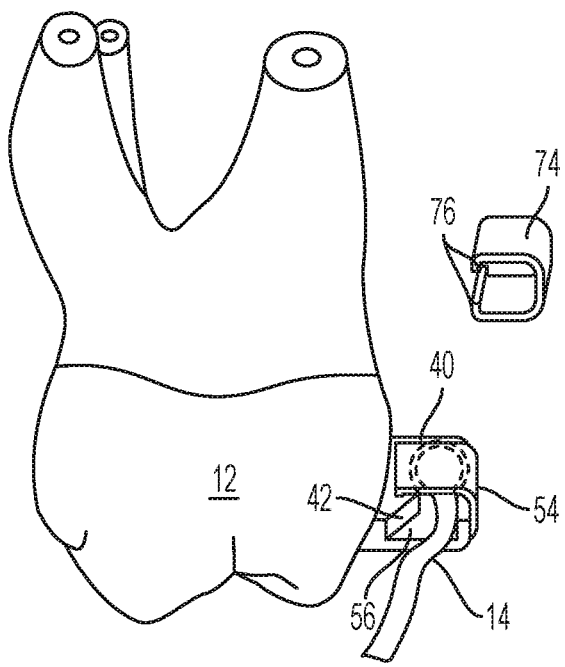
FIG. 12A is a mesial perspective view of the distal portion of the sliding distalizer in accordance with another embodiment of the present invention shown in conjunction with a molar tooth.
Figure 12B:
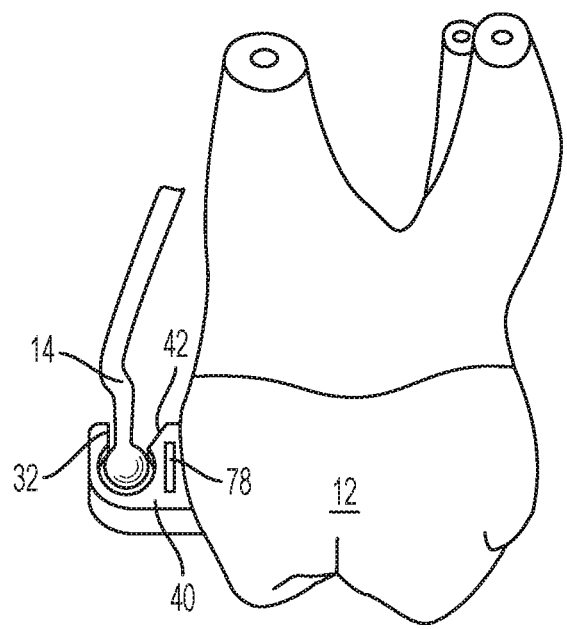
FIG. 12B is a is a distal perspective view of the distal portion of the sliding distalizer of FIG. 12A shown in conjunction with a molar tooth.
Figure 12C:
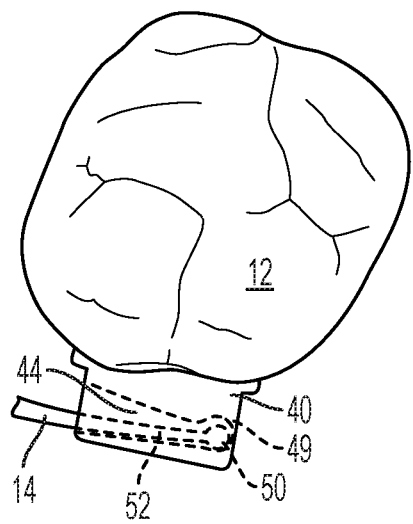
FIG. 12C is an occlusal view of the distal portion of a sliding distalizer in accordance with yet another embodiment of the present invention shown in conjunction with a molar tooth.
Figure 12D:
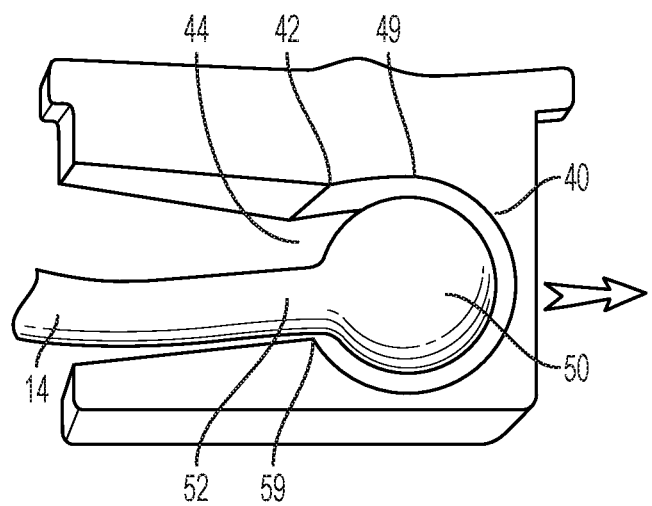
FIG. 12D is gingival perspective view of the distal portion of a sliding distalizer in accordance with yet another embodiment of the present invention.
Figure 12E:
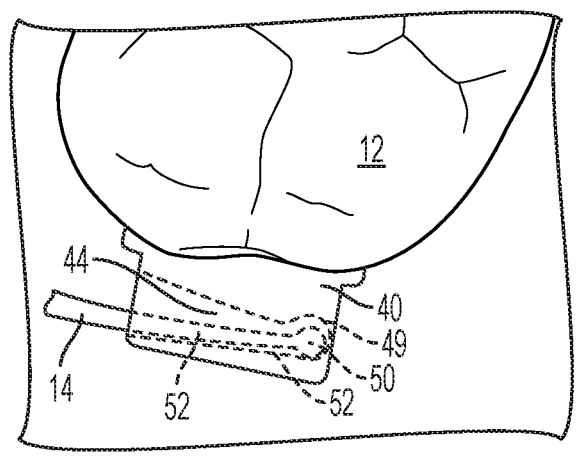
FIG. 12E is an enlarged occlusal view of the distal portion of the sliding distalizer of FIG. 12C.

With reference to FIGS. 12C, and 12E, a spherical engagement feature 50 at the distal end 52 of rod 30 engages a distal wall of molar tube 40. Molar tube 40 receives spherical engagement features in retention feature 49. Interior 44 of molar tube 40 may be tapered, as shown in dotted lines in the figures. In one embodiment distal end 52 is initially in contact with the interior of the buccal wall 54 of molar tube 40. As the rod 30 is moved distally under the force of the traction element, engagement feature 50 pushes against the distal wall of molar tube 40 and the molar 12 is rotated. As rotation takes place the lingual wall of molar tube 40 is rotated towards distal end 52 until it makes contact therewith (not shown).

FIG. 12D is an enlarged perspective view of the distal rod end 52, which is distal of the step-down portion 14, having a spherical engagement feature 50 coupled to a retention feature of an upper molar component 40 in the form of a funneled keyhole-clasp 49, in accordance with yet another embodiment of the present invention. The funneled keyhole-clasp 49 may feature at least one restriction feature 42, or 59 for restricting the motion of the engagement feature 50 and preventing the removal thereof from the keyhole-clasp 49. As the rod 30 is moved in the direction of the arrow under force of the traction element, feature 50 pushes against the distal wall of molar component 40 and the molar is distalized.

FIGS. 12A-12B, and 12F-H depict a distal portion of a molar distalizer in accordance with yet another embodiment of the present invention. The molar component is in the form of a C-clasp 40 that is connected as a one-piece unit to the molar bonding pad 38 that attaches to the enamel of the molar 12. The C-clasp 40 has a floor 56 to allow the engagement feature 50 of the rod 30, which has a generally spherical or ellipsoidal shape, to rest on within the C-clasp 40. The C-clasp 40 additionally resists forward pull-out of the rod 30 component by largely (but not completely) wrapping around it. This leaves the front or mesial aspect of the engagement feature 50, where the rod 30 enters the C-clasp 40, without contact to allow for freer lateral (i.e. in the buccal lingual plane) movements of the rod 30.

The distalization rod force is thereby exerted and located further back, on the distal wall of the C-clasp housing 40. Within the C-clasp 40 that retains the rod 30, there is an outside (buccally located or cheek-side located) flared wall 32, and an inside (lingually located) flared wall 42 to additionally permit pin-free lateral movement of the rod 30 as the molar 12 distalizes.

A separate U-shaped clamp 74 may be placed over the top and bottom of the C-clasp 40 to lock the engagement feature 50 of rod 30 into the molar C-clasp 40. The U-shaped clamp 74 is three-walled and contains a set of top and bottom locking claws 76. To accommodate the locking claws 76 of the U-clamp 74, the C-clasp 40 has a complementary set of two locking grooves 78, one at the gingival (top) surface of C-clasp 40, and a similar locking groove 78 at the occlusal (bottom) surface of the C-clasp 40. These two locking grooves 78 may be in close proximity to the interface with the bonding pad. The two locking grooves 78 in C-clasp 40 permit the engagement and locking of the three-walled U-clamp 74 over the C-clasp 40. The three-walled clamp 74 slides from the posterior (back) of the C-clasp 40 and snaps into the C-clasp component's locking grooves 78, to lock the engagement feature 50 of the rod 30 into the C-clasp 40 from the top or gingival side. The floor of the C-clasp 56, automatically sandwiches-in securely the other occlusal, or bottom side of the engagement feature 50 of the rod 30.

Figure 12F:
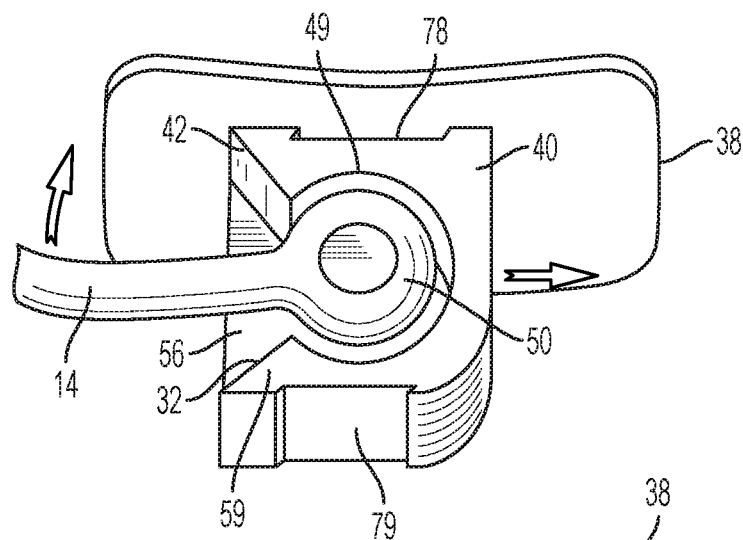
FIG. 12F is a buccal-gingival perspective view of the distal portion of a sliding distalizer in accordance with yet another embodiment of the present invention.
Figure 12G:
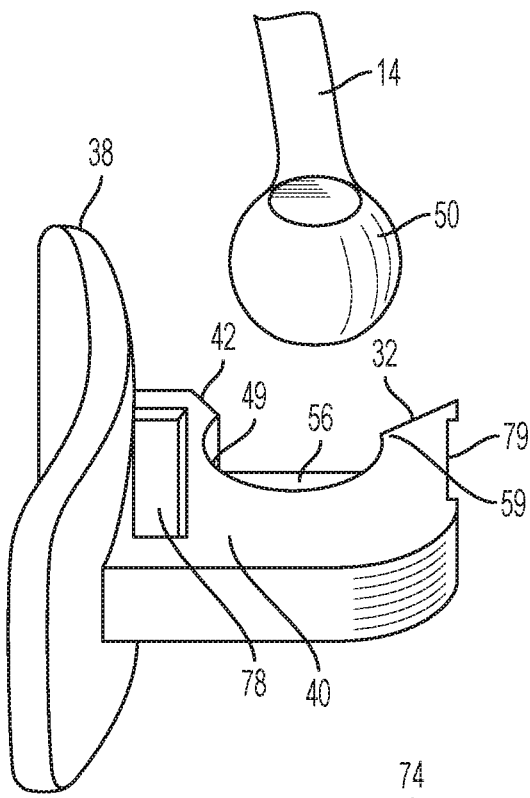
FIG. 12G is an occlusal view of the distal portion of the sliding distalizer of FIG. 12F.
Figure 12G:
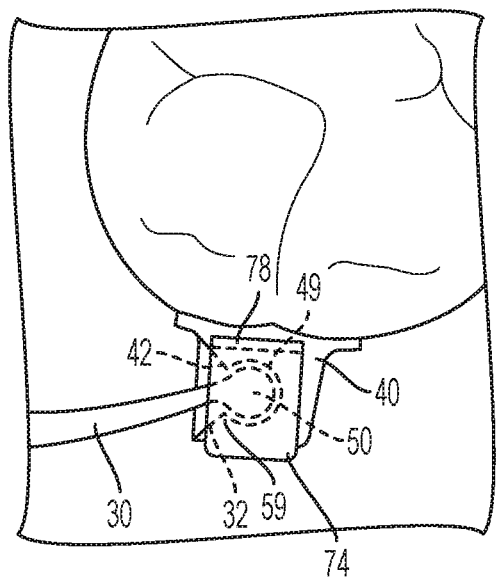
Figure 12H:
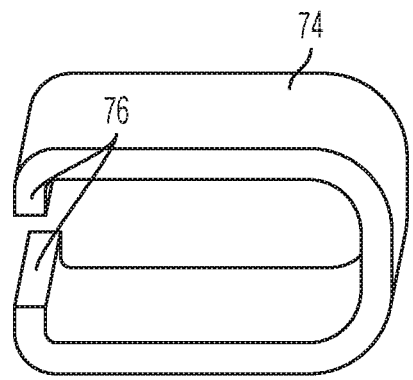
FIG. 12H is a disassembled distal-gingival perspective view of the distal portion of the sliding distalizer of FIG. 12F.

In addition, as shown in FIGS. 12F, and 12H, there may be a small inset 79 located on the buccal (cheek-side) of the C-clasp 40 to further secure the U-clamp 74 in a complementary manner, and thereby prevent the U-clamp 74 from slipping in a mesiodistal (front to back) direction. The three-walled U-clamp 74 helps house the engagement feature 50 of the rod 30 securely into the C-clasp 40, while allowing the rod 30 to push freely against the distal wall (back wall) of the C-clasp 40. Alternatively, three-walled U-clamp 74 can be laser-welded to the bonding base and C-clasp 40 to be more permanently locked thereto. Engagement feature 50, which may have a generally spherical shape, may be integrally formed on the distal end of the rod 30. The rod 30 may be held in the C-clasp 40 by the engagement feature 50 being held in place by a corresponding retention feature 49 such as a spherical void sized slightly larger than the engagement feature 50. The retention feature 49 may have restriction features 42 and 59 that maintain the engagement feature 50 within the retention feature 49, as shown in FIG. 12G.

Turning now to FIGS. 1A-1C, and FIG. 2 a sliding distalizer in accordance with another embodiment of the present invention is shown. In this embodiment, the distal portion of rod 30 has an ellipsoid engagement feature 50 and a vertically-oriented buccal push flange lever 70 proximal to the mesial-occlusal edges of the buccal wall 54 of molar tube 40. The buccal push flange lever exerts force distally on molar tube 40. Upper molar component 40 may be in the form of a flared clasp having a retention feature 49, and is attachable to a molar tooth via bonding pad 38. Engagement feature 50 is retained in retention feature 49 by restriction feature 59, near the mesial end of buccal wall 54, and restriction feature 42 near the mesial end of lingual wall 44. The engagement feature 50 is further retained vertically by an occlusal floor 56 and an gingival roof cap 72. The interior clasp housing 49 is flared outwardly to the mesial at mesial ends 31, 32 of buccal and gingival walls 54 and 48, respectively, to facilitate the insertion of engagement feature 50 into interior 49. Engagement feature 50 may rest on the occlusal bottom wall 56 of upper molar component 40. When the distalizer is moved distally, under the action of the traction element located on the rod-hook 34, buccal push flange lever 70 applies force on the molar component 40 in the direction of the arrow in FIG. 1B. The buccal push flange lever 70 may be buccally offset with respect to rod 30 such that the buccal push flange lever 70 engages a mesial edge of buccal wall 54. In some embodiments, the mesial edge of buccal wall 54 has a flared mesial end 32. Accordingly, buccal push flange lever 70 engages the buccal-most edge of flared mesial end 32 of buccal wall 54. The force is transferred to the molar via molar component 40 and bonding pad 38 causing molar 12 to slide distally.

Figure 1B:
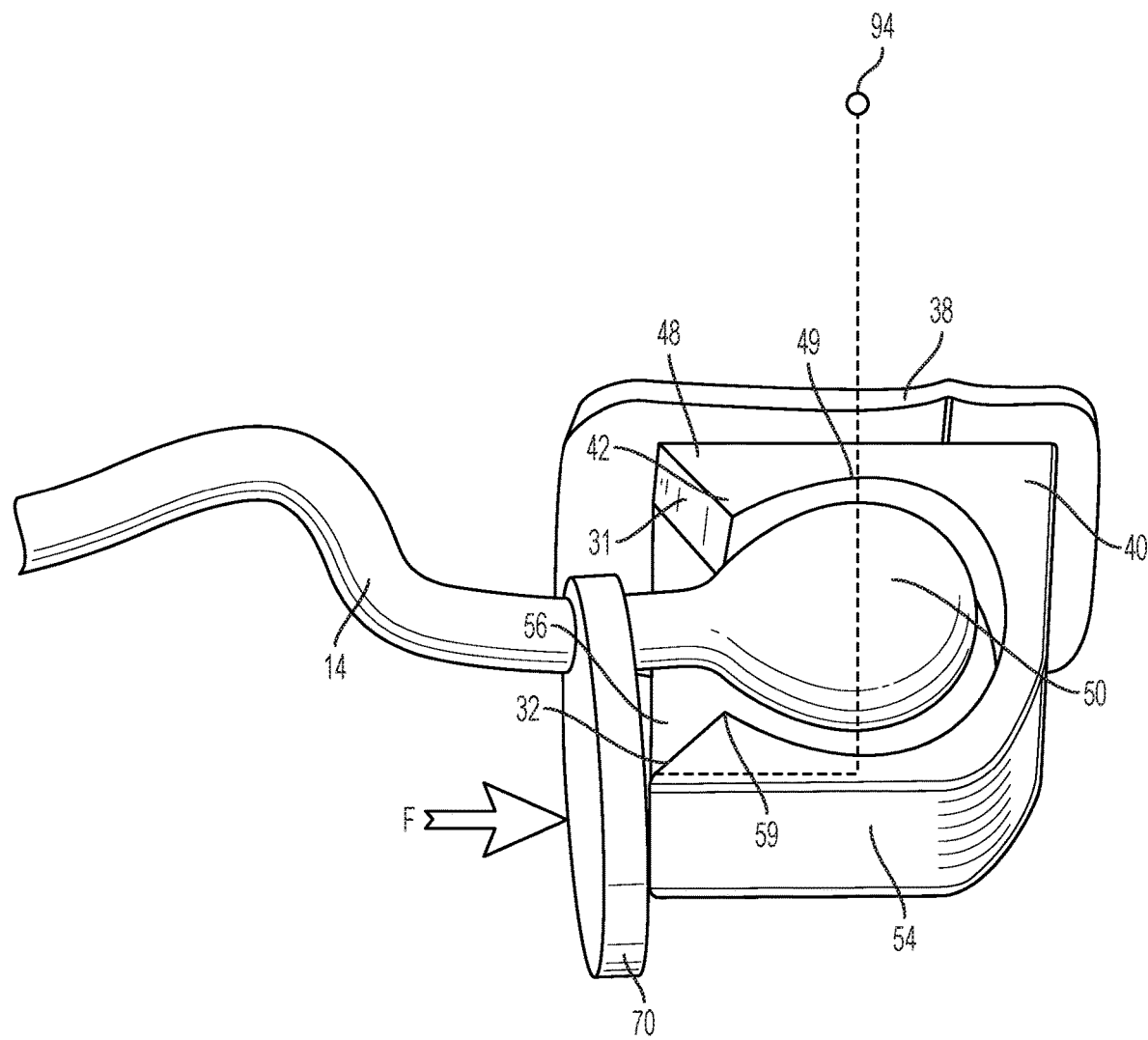
FIG. 1B is an enlarged three-quarter view from the buccal-gingival perspective of a distal portion of the sliding distalizer of FIG. 1A.
Figure 3A:
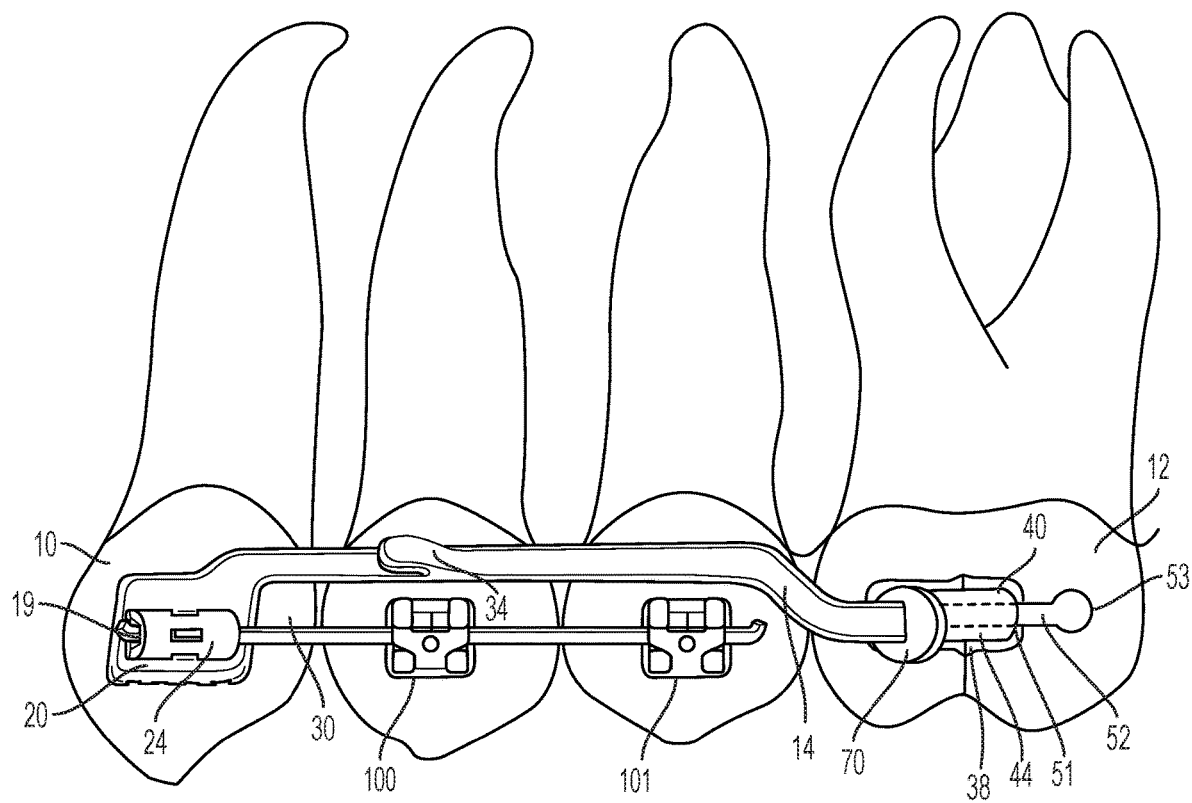
FIG. 3A is a buccal side view of the upper middle and posterior teeth, along with a sliding distalizer, in accordance with another embodiment of the present invention.
Figure 3B:
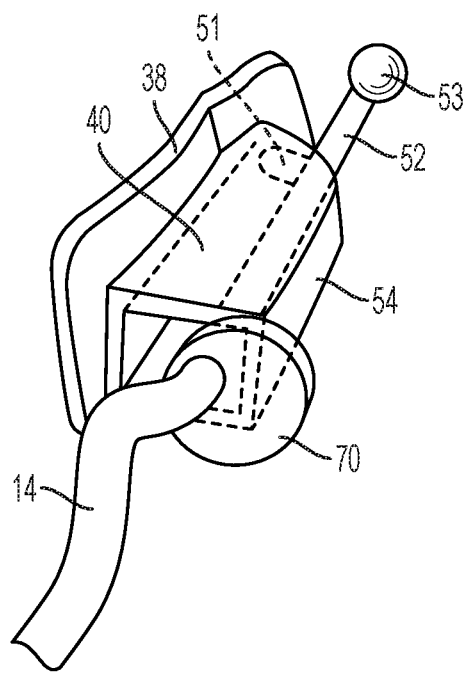
FIG. 3B is a generally mesial perspective view of a distal portion of the sliding distalizer of FIG. 3A.
Figure 3C:
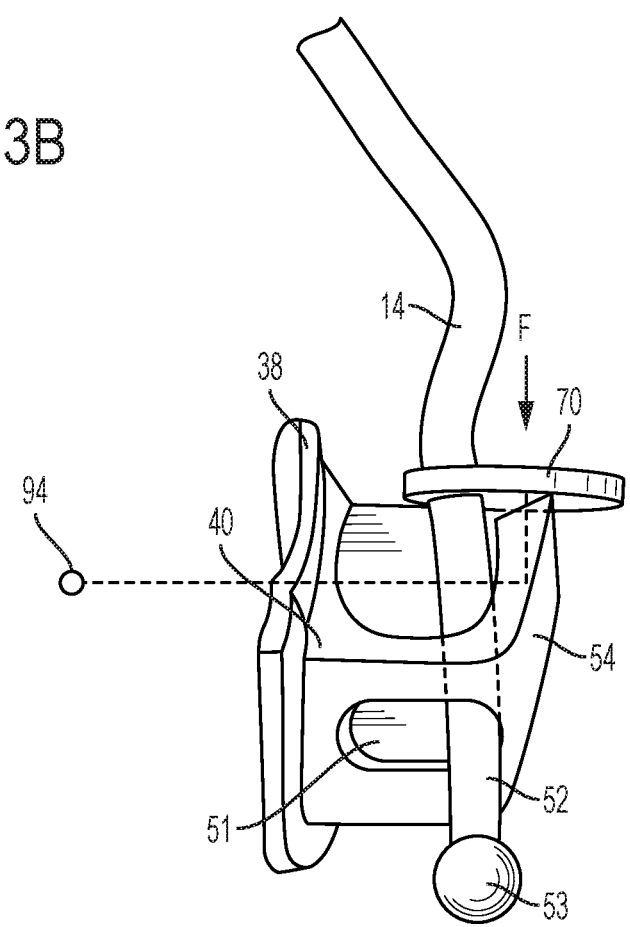
FIG. 3C is a generally distal perspective view of the distal portion of a sliding distalizer, in accordance with another embodiment of the present invention.
Figure 3D:
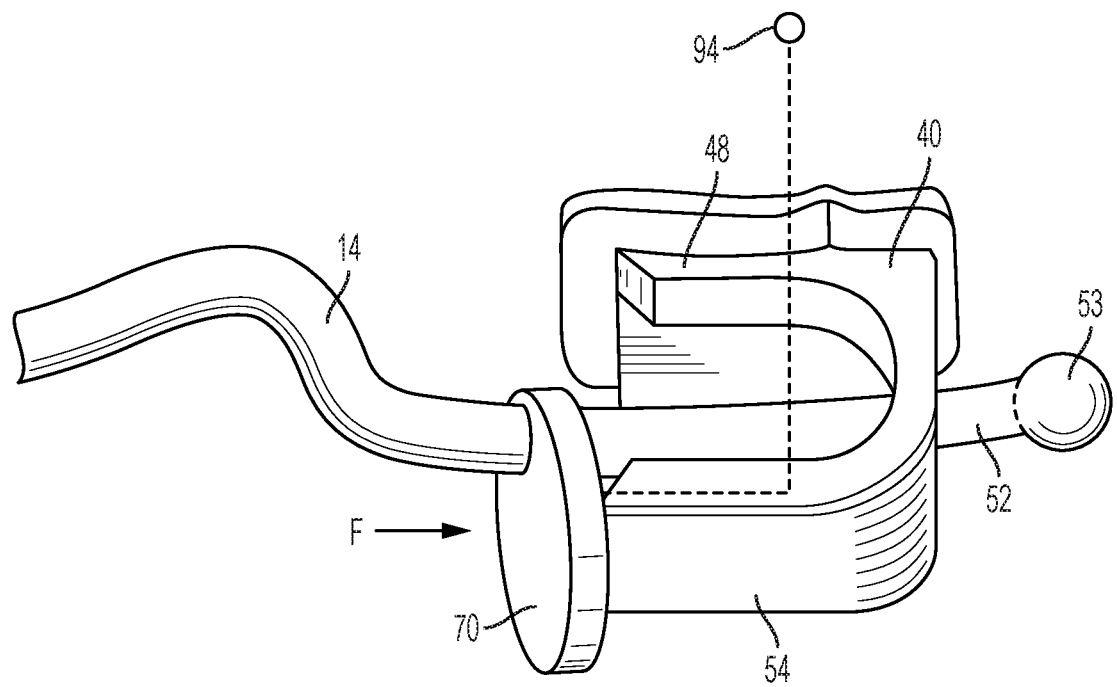
FIG. 3D is generally buccal-gingival perspective view of the distal portion of the sliding distalizer of FIG. 3C.
Figure 3E:
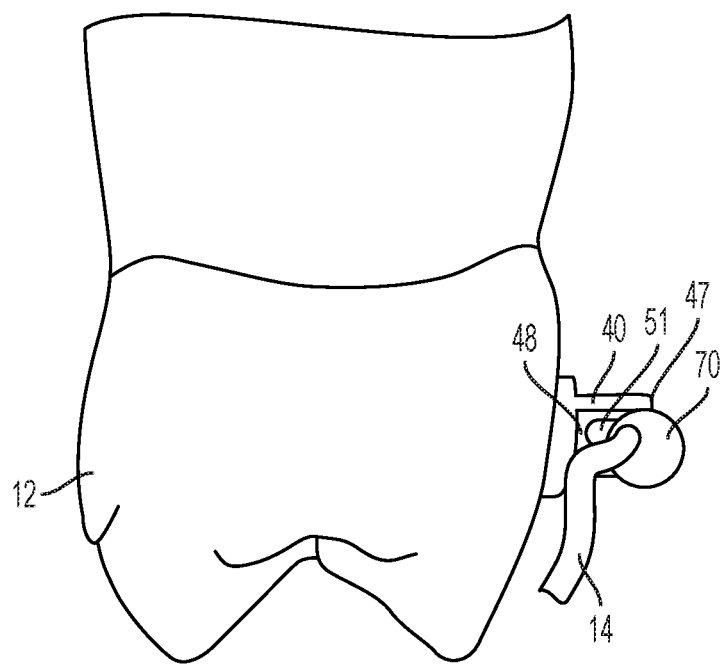
FIG. 3E is a generally mesial view of a distal portion of the sliding distalizer of FIG. 3A shown in relation to a molar tooth.

Advantageously, with reference to the transverse dimension shown in FIGS. 1B and 3D, due to the longer distance between the contact point of the buccal push flange lever 70 against the buccal-most edge of flared end 32 of buccal wall 54, and the molar center of resistance 94, the moment of force about molar 12 is increased, making molar rotation more effective. In addition, less force by the traction element force can be applied to distalize the molar 12 preventing the complication of root shortening. Furthermore, the buccal push flange lever 70 is closer to the center of resistance of the maxillary dentition 90 than prior art contact in the molar tube 40 that was further away namely more posterior to CR 90. In addition, the buccal push flange lever 70 is closer to the center of resistance of the maxilla 92 and in proximity to the zygoma (cheek bone), because it is also located closer to the cheek as well to restrict skeletal maxillary growth.

Figure 1C:
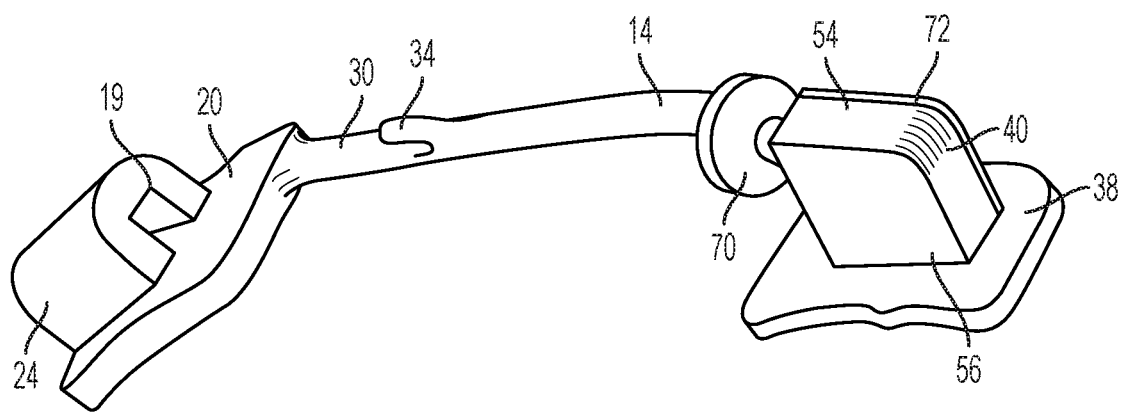
FIG. 1C is a three-quarter view, from the buccal-occlusal perspective, of the sliding distalizer of FIG. 1A.
Figure 2:
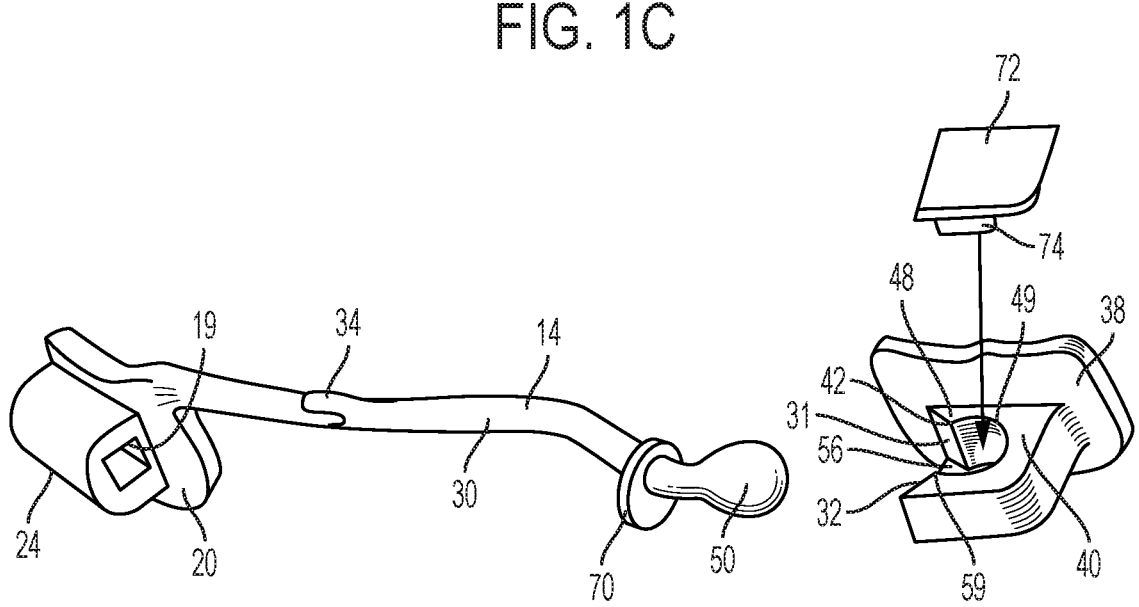
FIG. 2 is a three-quarter view, from the buccal-gingival perspective, of the sliding distalizer of FIGS. 1A-1C in disassembled form.

FIG. 2 shows the sliding distalizer of FIG. 1A-1C in disassembled mode. Upper molar component 40, which is in the form of a flared clasp, is shown decoupled from the engagement feature 50 and the buccal flange 70 located at distal portion of rod 30. Also shown is gingival roof cap 72 of the molar tube 40 lifted up and off the upper molar component 40. Cap 72 is provided with a protrusion 74 that is shaped and sized for fitting in retention feature 49. Cap 72 may be friction-fit onto molar component 40 by friction between protrusion 74 and the inside of walls 48 and 54 of molar component 40, or laser-welded or crimped onto the molar component.

FIGS. 4A-4B and 5A-5B depict an alternative to the buccal push flange lever 70. A vertically-oriented buccal push tab lever 84 is located on a distal portion of the saddle-shaped rod 30 proximal to the mesial edge 47 of floor 56 of molar tube 40. As the distalizer is moved distally by force of the traction element located on the rod-hook, as described earlier, the buccal push tab lever 84 engages the molar tube 40 at mesial edge 47 thus applying distal sliding force on the molar tube 40 and the molar 12. In one embodiment, the distal sliding force is applied to the molar tube 40 as the step-down portion 14 of the saddle-shaped rod 30 engages the visor-like over-hang 82 on molar tube 40. In another embodiment, the distal sliding force is applied to the molar tube 40 as buccal push tab lever 84 engages the mesial edge 47 of floor 56 of molar tube 40. In yet another embodiment, engagement feature 50, buccal push tab lever 84 and step down portion 14 may all engage the molar tube 40 simultaneously thus applying the distal sliding force on the molar 12 from various points. In other embodiments (not shown) the buccal push tab lever 84 may be horizontally oriented and may engage a mesial edge of a buccal wall 54 of molar tube 40 thus producing a larger moment of rotation about molar 12.

Turning now to FIGS. 3A-3E, and 5A-5B, and 14, the upper molar tube 40 has an aperture or hole 51 at the distal wall thereof. The distal end 52 of saddle-shaped rod 30 passes through interior 44 of molar tube 40, then exits molar tube 40 at aperture 51. Aperture 51 may be elliptical or have a length in the buccal-lingual direction longer than that in the occlusal-gingival direction, for permitting buccal-lingual movement of distal end 52 of rod 30 during treatment. The rod 30 has a blocking feature 53 affixed to distal end 52 thereby preventing the rod 30 from being removed from the molar tube 40, such as during chewing, etc. The blocking feature 53 may be crimped-on the rod, or threaded and likewise the rod 30 may also be threaded at distal end 52 permitting the blocking feature 53 to be screwed onto the rod 30 after placement through the aperture 51. Alternatively, the blocking feature 53 may be integrally formed or welded to the rod 30 at the tip of distal end 52 during manufacture of the appliance.

Figure 14:
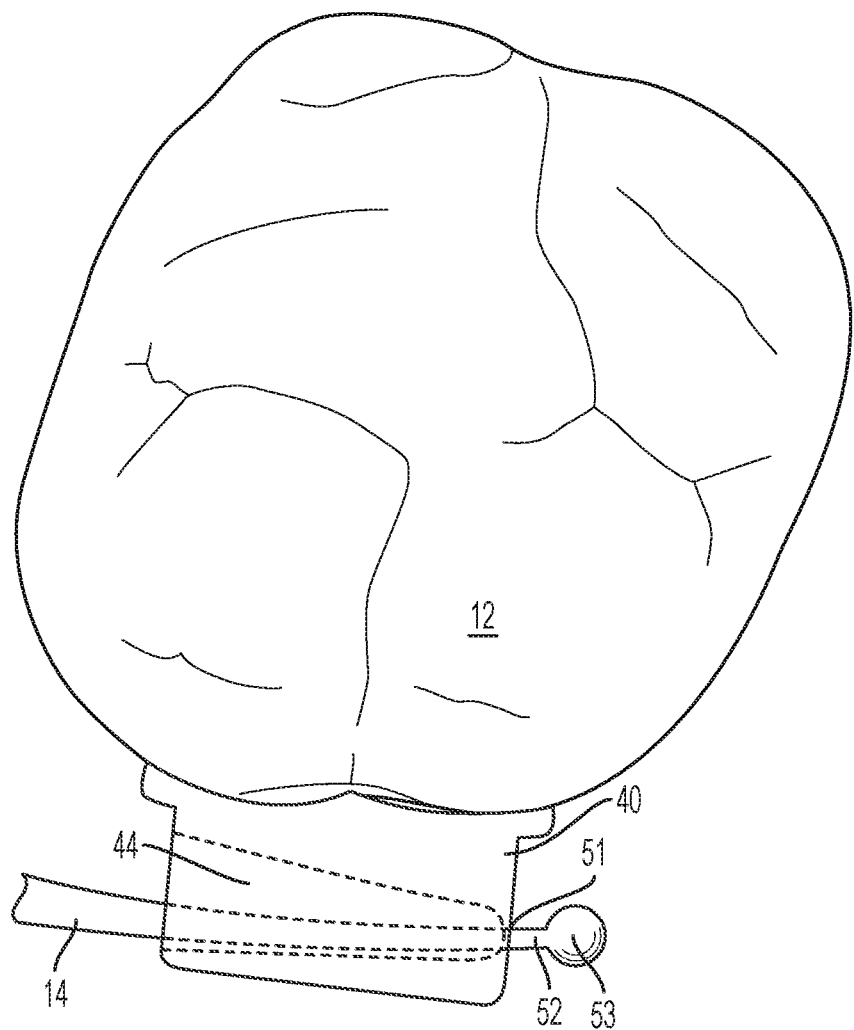
FIG. 14 is an enlarged occlusal view of the distal portion of a sliding distalizer in accordance with yet another embodiment of the present invention.
Figure 15:
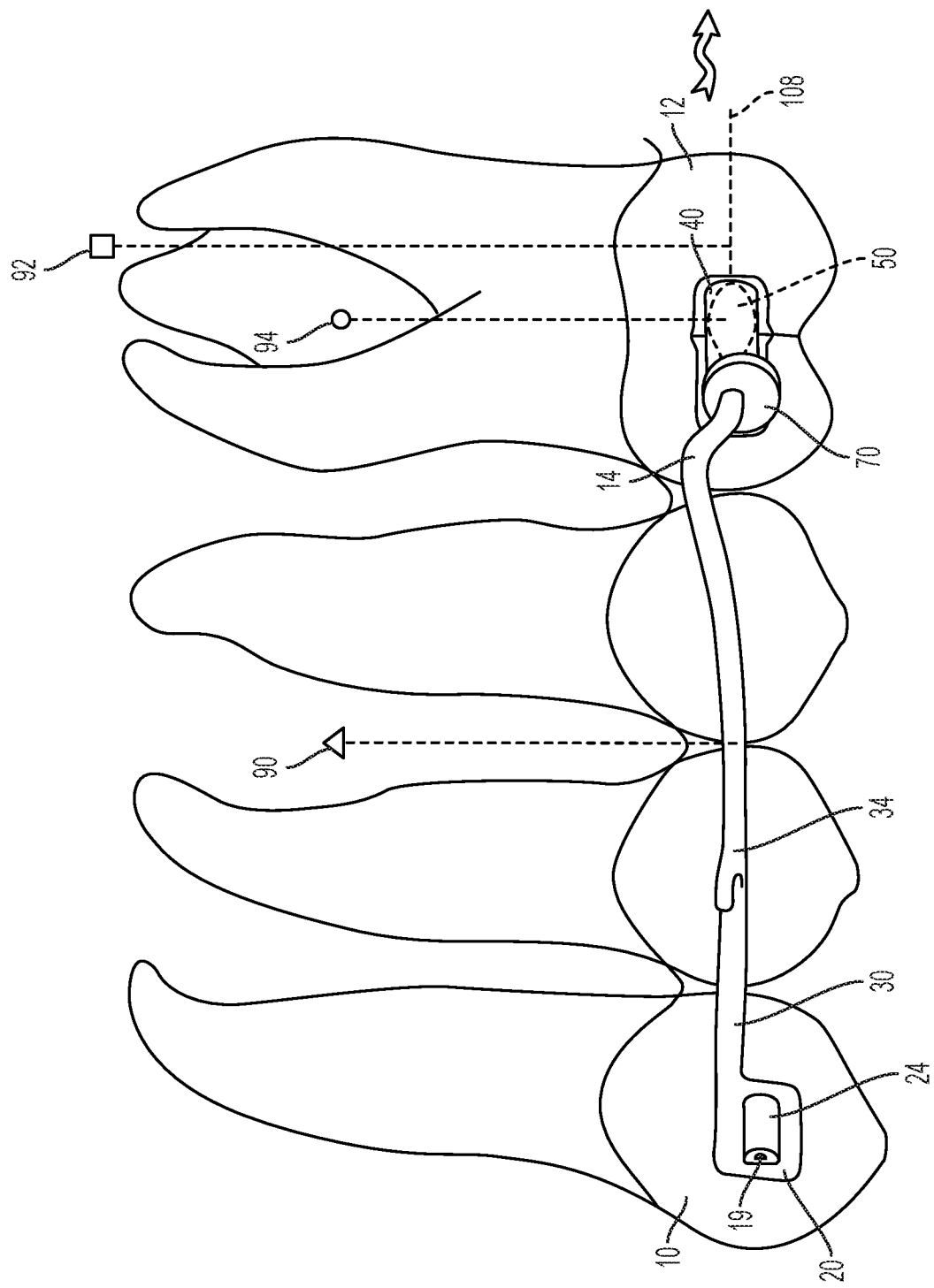
FIG. 15 is a buccal view of the distalizer of FIG. 1A showing the distal end of the rod lower occlusally than the mesial segment in accordance with yet another embodiment of the present invention.

With reference to FIG. 14, a portion of the distal end 52 of the rod 30 may frictionally engage an inside surface of a buccal wall 54 of the molar tube 40 to exert a distal force on the molar tube 40 under the force of the traction element on the rod-hook 34. In some embodiments, the aperture 51 may be sized so that a portion of the distal end 52 of the rod 30 frictionally engages the distal wall of molar tube 40 at the aperture 51 for exerting distal force on the molar tube 40 under the force of the traction element on the rod-hook 34. Interior 44 of molar tube 40 may be tapered, from the mesial opening 46 opening towards a distal wall thereof, as shown in dotted lines. In one embodiment distal end 52 is initially in contact with the interior of the buccal wall 54 of molar tube 40. As the rod 30 is moved distally under the force of the traction element, distal end 52 frictionally engages the distal wall of molar tube 40 at the aperture 51. This causes the molar tube 40 and the molar 12 to be distalized. As distalization takes place the lingual wall of molar tube 40 may rotate towards distal end 52 until it makes contact therewith (not shown).

Figure 6:
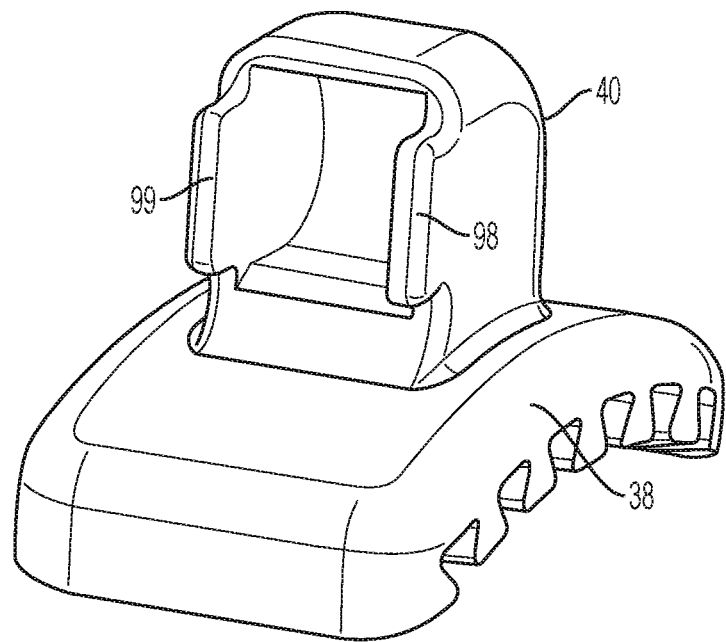
FIG. 6 is a mesial or front perspective view of the distal segment molar component with external locking claws in straight alignment as part of a sliding distalizer, in accordance with yet another embodiment of the present invention.
Figure 7:
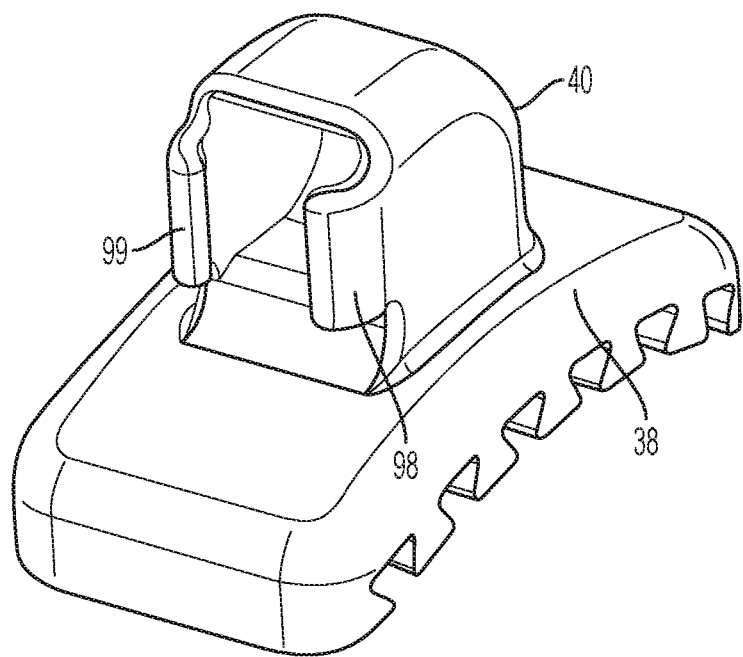
FIG. 7 is a mesial or front perspective view of the distal segment molar component of FIG. 6 with the external locking claws folded in a curved configuration as part of a sliding distalizer.
Figure 8:
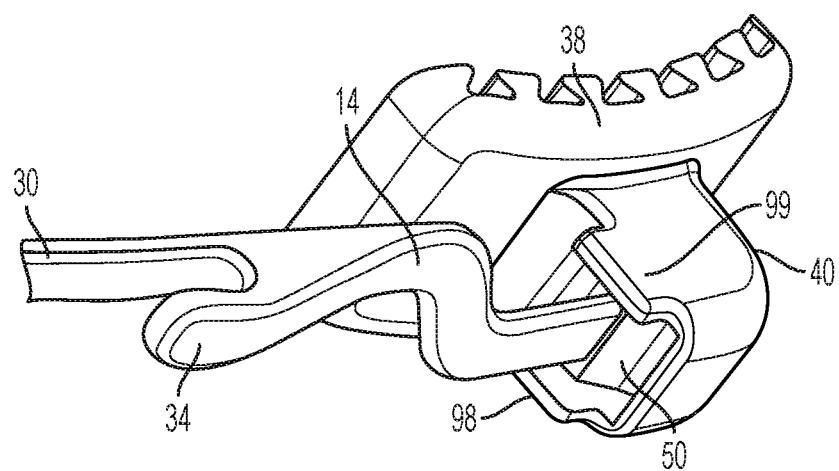
FIG. 8 is a three-quarter view from a buccal-gingival perspective of the mesial segment bar with rod-hook, and the distal segment molar component with external locking claws in straight alignment as part of a sliding distalizer.
Figure 9A:
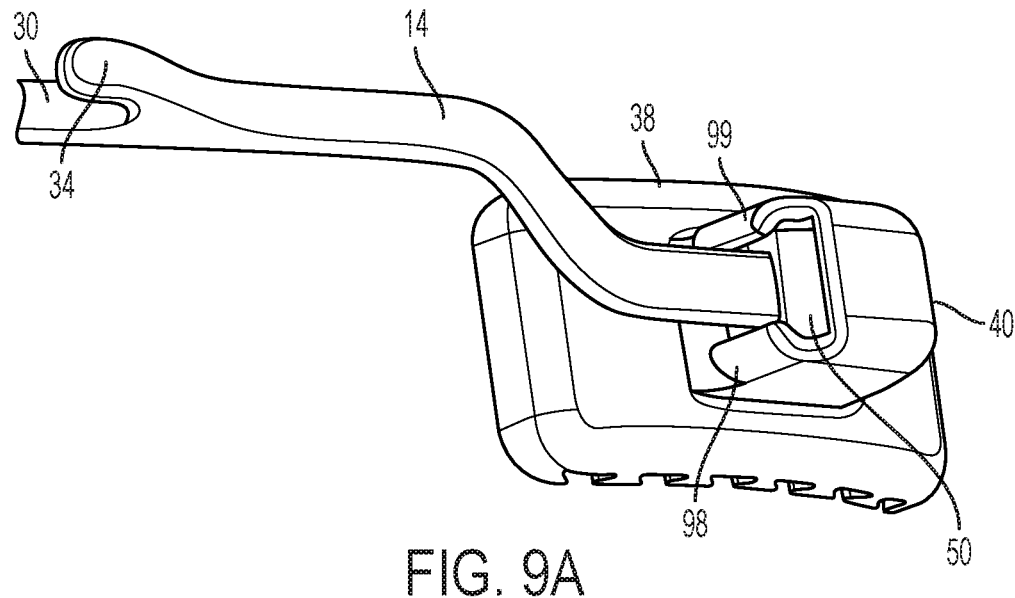
FIG. 9A is a three-quarter view from a buccal-occlusal perspective of the mesial segment bar with rod-hook, and the distal segment molar component with external locking claws folded in a curved configuration locking the mesial segment bar end component into the molar component as part of a sliding distalizer.
Figure 9B:
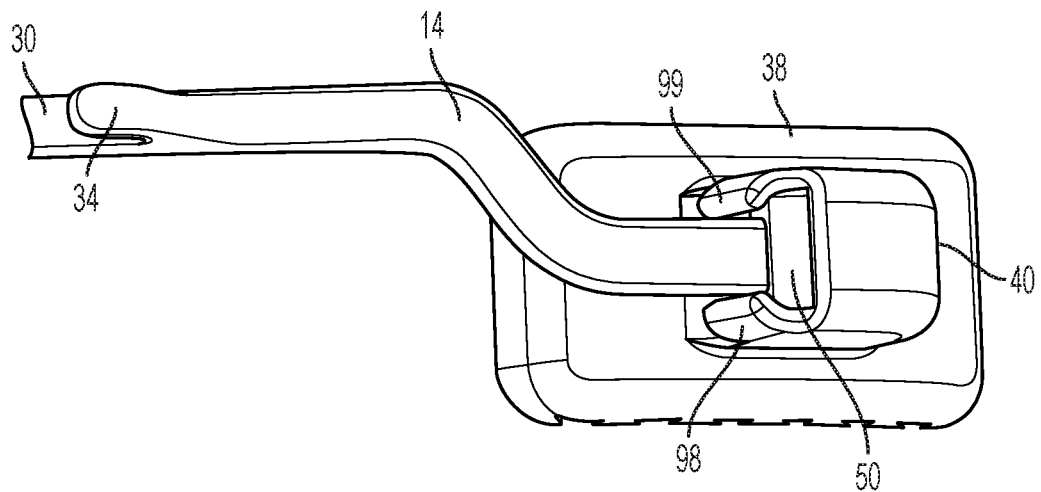
FIG. 9B is a buccal side view of the mesial segment rod and rod-hook with the distal segment molar component and the external locking claws in FIG. 9A folded in a curved configuration locking the mesial segment bar end of a sliding distalizer.
Figure 10F:
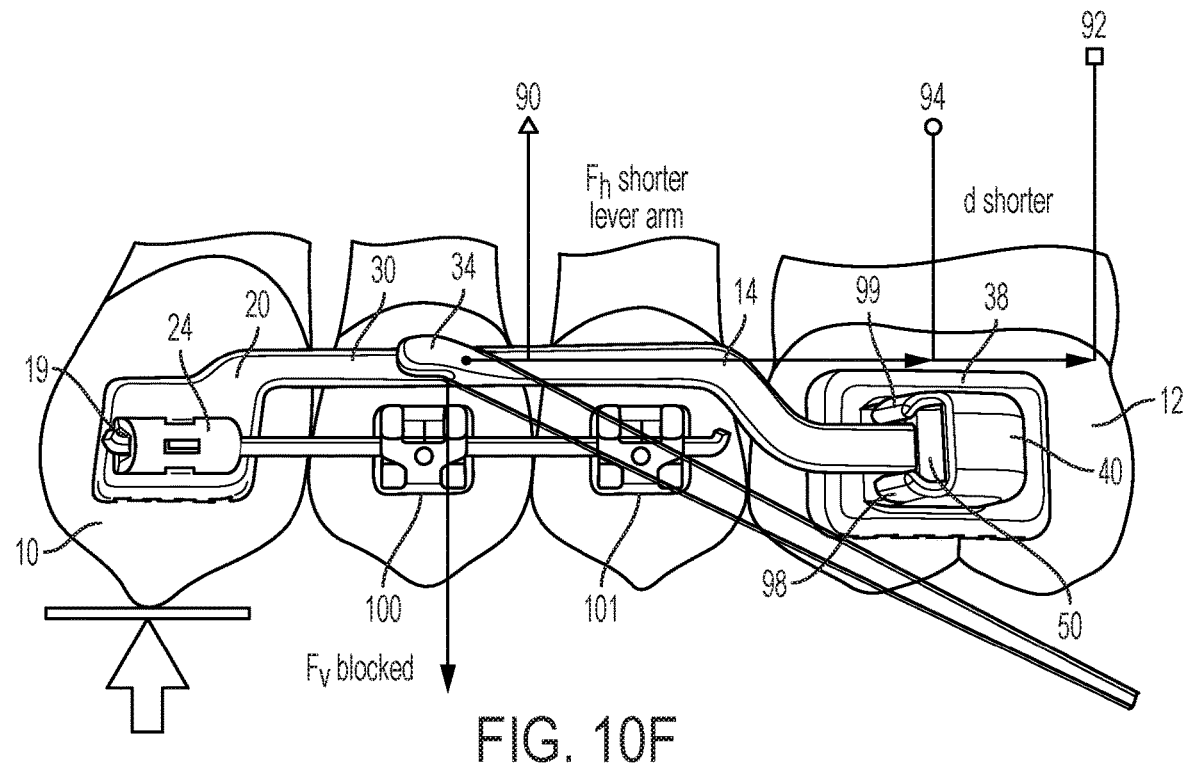
FIG. 10F is a buccal side view of the assembled mesial segment showing the prevention of canine extrusion (large arrow) by using the support of the sectional, rectangular archwire passing through the orthodontic tube and two premolar self-ligating brackets.

In yet another embodiment shown in FIGS. 6, 7, 8, 9A-9B, and 10A-10F the distal component of the sliding distalizer is shown with locking claws 98 and 99, that maintain the end of the rod 30 therein. The claws 98 and 99 may be formed at top (gingival) and bottom (occlusal) walls of molar tube 40. FIG. 6 depicts the molar tube 40 with claws 98 and 99 in open mode wherein they are in straight alignment with the gingival and occlusal walls of molar tube 40. FIG. 7 depicts molar tube 40 with the locking claws 98 and 99 in locking mode wherein they are in a curved configuration. Typically, the molar tube 40 has the claws 98 and 99 in open mode, then a distal end of rod 30 is inserted inside the molar tube 40. The distal end of rod 30 may comprise an engagement feature 50 as shown in FIGS. 8, and 9A-9B. Subsequent to the insertion of the distal end of rod 30 into the molar tube 40, the locking claws 98 and 99, are moved into locking mode, either by crimping or by any other method. This is depicted in FIGS. 10A-10F which show different views of the distalizer.

Although the interior 44 of the molar tube 40 is shown as a void, the void may be filled with a compressible material such as lubricant, polycarbonate, wax, foam or rubber in order to adjust the amount of distalization force on the molar 12. Alternatively, the interior 44 of the molar tube 40 may be coated with a material such as wax to increase the friction to reduce slippage between the rod 30 and the interior 44 or to the maintain the components in position during initial bonding of the entire appliance.

Although the embodiments herein show a distalizer for Class II correction, the distalizer can be placed on the lower canine and lower molar for Class III correction with a separate traction element attached to a separate button attachment at the upper first molar.

Although the embodiments here demonstrate the orthodontic appliance placed on a canine and a molar, the orthodontic appliance may be made shorter so that is may be applied to different pairs of teeth. In another alternative, the attachment may be placed on a mesial tooth with suitable root strength (such as a first premolar), and the molar tube may be possibly placed on any suitable distal tooth (such as a second molar).

Although the embodiments herein show a distalizer on the buccal side of a patient's teeth, the distalizer may be applied to the lingual side of a patient's teeth.

Although the embodiments herein show a buccal push flange lever, in the case of a distalizer on the lingual side of a patient's cheek the push flange lever would be lingual as well.

Although the embodiments herein show a buccal push tab lever, in the case of a distalizer on the lingual side of a patient's cheek the push tab lever would be lingual as well.

The embodiments described herein are only examples and are not intended to limit the claims. One of skill in the art would be able to adapt the description herein and substitute equivalent elements performing the same or similar function.

The invention claimed is:

1. An orthodontic appliance for orthodontic treatment of a posterior maxillary sector extending from a mesial anchor tooth to a molar tooth unilaterally on the same side of the maxilla, comprising:
   a molar component including a bonding pad for affixing the molar component to the molar tooth, the molar component having a mesial opening to an interior of the molar component;
   a mesial anchor tooth attachment, including a bonding pad for affixing the mesial anchor tooth attachment to the mesial anchor tooth;
   a rod, curved towards the gingival direction in the occlusal-gingival plane, and extending from the mesial anchor tooth attachment towards the molar component in a mesiodistal direction; and
   a hook, located on the rod between the molar component and the mesial anchor tooth attachment, for attachment with a traction element for direct molar traction;
   wherein a distal end of the rod engages at least one surface of the molar component to exert a distal force on the molar tooth when under a force of the traction element on the hook.

2. The orthodontic appliance according to claim 1, wherein the rod has a curved distal step-down portion.

3. The orthodontic appliance according to claim 2, wherein the hook is located on the curved distal step-down portion.

4. The orthodontic appliance according to claim 3, wherein as the orthodontic appliance is moved distally by force of the traction element the distal step-down portion of the rod engages a mesial end of a visor over-hang formed on a gingival roof wall of the molar component.

5. The orthodontic appliance according to claim 4, wherein the visor over-hang is curved to follow the path of the rod as the molar tooth is distalized.

6. The orthodontic appliance according to claim 4, wherein the visor is a separately welded component affixed to the molar component or integrally formed therewith.

7. The orthodontic appliance according to claim 1, wherein the traction element comprises an elastic.

8. The orthodontic appliance according to claim 1, wherein the distal end of the rod is occlusally lower than a mesial end thereof.

9. The orthodontic appliance according to claim 1, wherein a mesial end of the rod is occlusally lower than the distal end thereof.

10. The orthodontic appliance according to claim 1, wherein a mesial end of the rod comprises a mesial step-up portion from the mesial anchor tooth attachment to the rod.

11. The orthodontic appliance according to claim 10, wherein the mesial setup-up portion is curved.

12. The orthodontic appliance according to claim 10, wherein the hook is located on the mesial step-up portion.

13. The orthodontic appliance according to claim 1, wherein the at least one surface of the molar component comprises a distal wall thereof.

14. The orthodontic appliance according to claim 1, wherein the interior of the molar component is tapered from the mesial opening towards a distal wall thereof.

15. The orthodontic appliance according to claim 1, wherein the hook is located on an upper section of the rod.

16. The orthodontic appliance according to claim 1, wherein the mesial anchor tooth attachment further includes an orthodontic tube containing an archwire slot therethrough in the mesiodistal direction, the archwire slot being sized for permitting the insertion of an archwire to pass generally mesiodistally from the mesial anchor tooth attachment into at least one premolar bracket.

17. The orthodontic appliance according to claim 16, further comprising at least one premolar bracket for affixment to a premolar and located occlusally below an upper section of the rod.

18. The orthodontic appliance according to claim 1, wherein the rod comprises an engagement feature at the distal end thereof, and the molar component has a retention feature suitable for receiving the engagement feature.

19. The orthodontic appliance according to claim 18, wherein the engagement feature is essentially D-shaped, and the retention feature is sinusoidal.

20. The orthodontic appliance according to claim 18, wherein the engagement feature is generally spherical and the retention feature is in the form of a funneled keyhole clasp.

21. The orthodontic appliance according to claim 20, wherein the engagement feature is coupled to the retention feature and is pushing distally on a distal wall of the molar component.

22. The orthodontic appliance according to claim 18, wherein the molar component is in the form of a C-clasp having an occlusal floor for supporting the engagement feature.

23. The orthodontic appliance according to claim 22, further comprising a U-clamp containing locking claws which cooperatively fit with locking grooves on the C-clasp to permit the engagement and locking of the U-clamp over the C-clasp thus retaining the engagement feature within the C-clasp.

24. The orthodontic appliance according to claim 18, wherein the molar component includes locking claws that maintain the engagement feature within the molar component.

25. The orthodontic appliance according to claim 18, further comprising a vertically-oriented push flange lever near the distal end of the rod and mesial from the engagement feature, for exerting a distal force on the molar component.

26. The orthodontic appliance according to claim 25, wherein the vertically-oriented push flange lever is offset with respect to the rod such that the push flange lever engages a mesial edge of a wall of the molar component when the rod is moved distally under the force of the traction element.

27. The orthodontic appliance according to claim 18, wherein the molar component is in the form of a flared clasp having a housing flared outwardly to the mesial for facilitating the insertion of the engagement feature into an interior of the housing.

28. The orthodontic appliance according to claim 18, wherein the engagement feature is retained in the retention feature by a restriction feature on a buccal wall of the molar component.

29. The orthodontic appliance according to claim 28, wherein the engagement feature is further retained in the retention feature by a restriction feature on a lingual wall of the molar component.

30. The orthodontic appliance according to claim 18, wherein the engagement feature is retained vertically inside the molar component by an occlusal floor and a gingival roof wall.

31. The orthodontic appliance according to claim 18, wherein the engagement feature comprises an ellipsoid shape.

32. The orthodontic appliance according to claim 18, further comprising a vertically-oriented push tab lever near the distal end of the rod and mesial from the engagement feature, for exerting a distal force on the molar component.

33. The orthodontic appliance according to claim 32, wherein as the orthodontic appliance is moved distally by force of the traction element, the vertically-oriented push tab lever engages a mesial end of an occlusal floor of the molar component.

34. The orthodontic appliance according to claim 1, wherein the molar component has an aperture formed in the distal wall for receiving the distal end of the rod therethrough.

35. The orthodontic appliance according to claim 34, wherein the interior of the molar component is tapered from the mesial opening towards a distal wall thereof, and wherein a portion of the distal end of the rod frictionally engages an inside surface of a wall of the molar component to exert the distal force on the molar component under the force of the traction element on the hook located on the rod.

36. The orthodontic appliance according to claim 34, wherein the aperture is sized so that a portion of the distal end of the rod frictionally engages the distal wall at the aperture for exerting a distal force on the molar component under the force of the traction element on the hook.

37. The orthodontic appliance according to claim 34, further comprising a blocking feature affixed to a distal tip of the distal end of the rod for preventing the rod from being removed from the molar component.

38. The orthodontic appliance according to claim 37, wherein the blocking feature is one of: crimped on, welded on, and integrally formed with the distal end of the rod.

39. The orthodontic appliance according to claim 34, further comprising a vertically-oriented push flange lever near the distal end of the rod and positioned for exerting a distal force on a mesial end of the molar component.

40. The orthodontic appliance according to claim 39, wherein the vertically-oriented push flange lever is offset with respect to the rod such that the push flange lever engages a mesial edge of a wall of the molar component when the rod is moved distally under the force of the traction element.

41. The orthodontic appliance according to claim 39, wherein a wall of the molar component is flared lingually such that the vertically-oriented push flange lever engages a tip of the mesial edge of a wall of the molar component.

42. The orthodontic appliance according to claim 34, wherein the aperture has a length in the buccal-lingual direction longer than that in the occlusal-gingival direction, for permitting buccal-lingual movement of the distal end of the rod during treatment.

43. The orthodontic appliance according to claim 34, further comprising a vertically-oriented push tab lever near the distal end of the rod and mesial from the engagement feature, for exerting a distal force on the molar component.

44. The orthodontic appliance according to claim 43, wherein as the orthodontic appliance is moved distally by force of the traction element, the vertically-oriented push tab lever engages a mesial end of an occlusal floor of the molar component.

45. The orthodontic appliance according to claim 1, wherein the mesial anchor tooth is a canine.

46. The orthodontic appliance according to claim 1, wherein the mesial anchor tooth is a premolar.

* * * * *